United States Patent
Zhao et al.

(10) Patent No.: US 8,788,826 B1
(45) Date of Patent: Jul. 22, 2014

(54) METHOD AND APPARATUS FOR DYNAMICALLY ALLOCATING A MOBILE NETWORK PREFIX TO A MOBILE TERMINAL

(75) Inventors: Fan Zhao, San Jose, CA (US); Ameya Damle, Santa Clara, CA (US); Stefano Faccin, Hayward, CA (US)

(73) Assignee: Marvell International Ltd., Hamilton (BM)

( * ) Notice: Subject to any disclaimer, the term of this patent is extended or adjusted under 35 U.S.C. 154(b) by 566 days.

(21) Appl. No.: 12/480,520

(22) Filed: Jun. 8, 2009

Related U.S. Application Data

(60) Provisional application No. 61/059,488, filed on Jun. 6, 2008, provisional application No. 61/078,601, filed on Jul. 7, 2008, provisional application No. 61/091,889, filed on Aug. 26, 2008.

(51) Int. Cl.
*H04L 29/06* (2006.01)
*H04L 29/12* (2006.01)
*H04W 8/26* (2009.01)

(52) U.S. Cl.
CPC ........... *H04L 29/12283* (2013.01); *H04W 8/26* (2013.01); *H04L 61/2061* (2013.01); *H04L 61/2007* (2013.01); *H04L 61/2053* (2013.01)
USPC .......................................... 713/171; 713/162

(58) Field of Classification Search
CPC ..................... H04L 29/12283; H04L 61/2061; H04L 61/2007; H04L 61/2053; H04W 8/26
USPC .................................................. 713/171, 162
See application file for complete search history.

(56) References Cited

U.S. PATENT DOCUMENTS

| | | | |
|---|---|---|---|
| 2004/0205211 A1* | 10/2004 | Takeda et al. ................. | 709/230 |
| 2005/0195773 A1* | 9/2005 | Popovich et al. ............. | 370/338 |
| 2006/0184692 A1* | 8/2006 | Ikeda ............................ | 709/245 |
| 2006/0227971 A1* | 10/2006 | Haddad ........................ | 380/247 |
| 2007/0124592 A1* | 5/2007 | Oyama ......................... | 713/171 |
| 2008/0043614 A1* | 2/2008 | Soliman ....................... | 370/208 |
| 2008/0049717 A1* | 2/2008 | Jamieson et al. ............ | 370/351 |
| 2008/0095114 A1* | 4/2008 | Dutta et al. .................. | 370/331 |
| 2009/0238099 A1* | 9/2009 | Ahmavaara ................... | 370/254 |
| 2010/0091707 A1* | 4/2010 | Janneteau et al. ........... | 370/328 |

OTHER PUBLICATIONS

P. Eronen, RFC 4555: IKEv2 Mobility and Multihoming Protocol (MOBIKE), Jun. 2006, Retrieved from http://www.ietf.org/rfc/rfc4555.txt, pp. 1-33.*
V. Devarapalli, RFC 4877: Mobile IPv6 Operation with IKEv2 and the Revised IPsec Architecture, Apr. 2007, Retrieved from http://www.ietf.org/rfc/rfc4877.txt, pp. 1-26.*

(Continued)

*Primary Examiner* — Chau Le

(57) ABSTRACT

A method and apparatus for dynamically allocating a mobile network prefix to a mobile terminal, in which the mobile terminal is associated with a user equipment. The method includes sending a message from the user equipment to a home agent to establish a security association between the user equipment and the home agent. The message includes a request for a mobile network prefix to be assigned to the mobile terminal equipment. The method further includes the home agent allocating a mobile network prefix to be assigned to the mobile terminal equipment, and assigning the allocated mobile network prefix to the mobile terminal equipment.

14 Claims, 18 Drawing Sheets

(56) References Cited

OTHER PUBLICATIONS

Giaretta et al., RFC 5026: Mobile IPv6 Bootstrapping in Split Scenario, Oct. 2007, Retrieved from http://www.ietf.org/rfc/rfc5026.txt, pp. 1-28.*

Thubert et al., Internet-Draft: Mobile Network Prefix Delegation, Aug. 2007, retrieved from http://tools.ietf.org/pdf/draft-ietf-nemo-prefix-delegation-02.pdf, pp. 1-23.*

Wan et al., The Bootstrapping for Proxy Mobile IPv6, Retrieved from http://tools.ietf.org/pdf/draft-wan-netlmm-pmip-bootstrapping-00.pdf, Jul. 2007, pp. 1-15.*

Droms et al., RFC 3315—Dynamic Host Configuration Protocol for IPv6 (DHCPv6), Jul. 2003, Retrieved from http://tools.ietf.org/html/rfc3315.*

\* cited by examiner

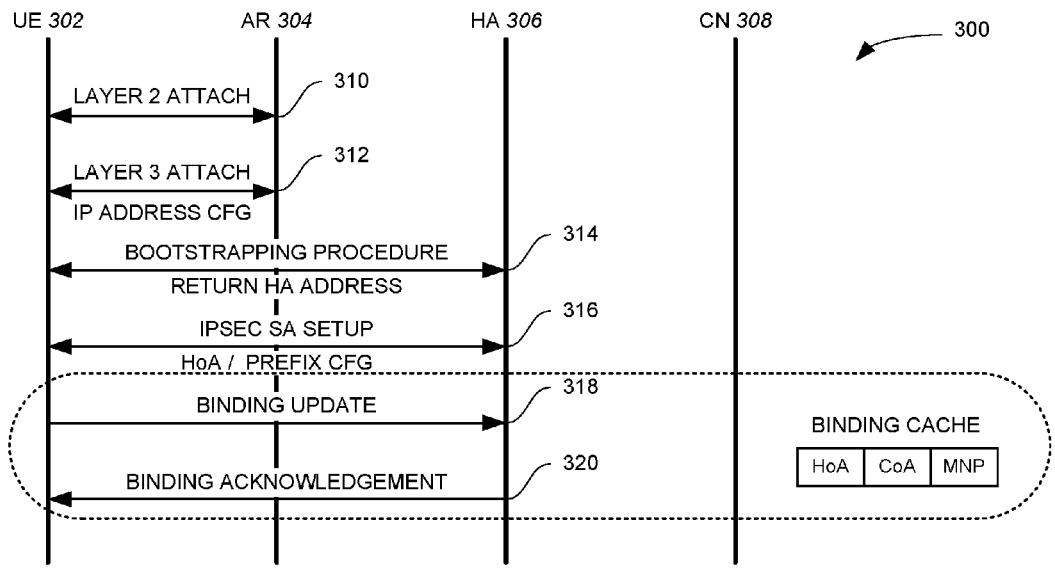
FIG. 3 *(PRIOR ART)*
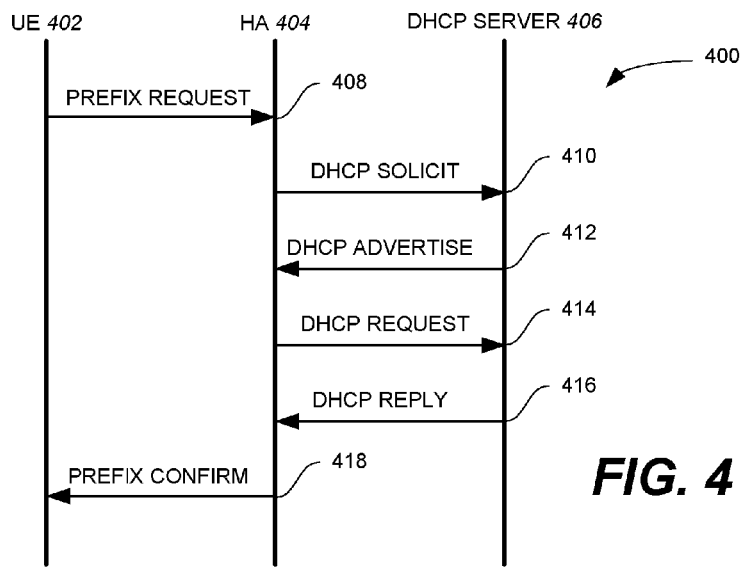
FIG. 4 *(PRIOR ART)*

FIG. 6 *(PRIOR ART)*

METHOD AND APPARATUS FOR DYNAMICALLY ALLOCATING A MOBILE NETWORK PREFIX TO A MOBILE TERMINAL

CROSS-REFERENCE TO RELATED APPLICATIONS

This disclosure claims the benefit of U.S. Provisional Application No. 61/059,488, filed Jun. 6, 2008, U.S. Provisional Application No. 61/078,601, filed Jul. 7, 2008, and U.S. Provisional Application No. 61/091,889, filed Aug. 26, 2008.

FIELD

The present disclosure generally relates to wireless networks, and more specifically to techniques for allocating mobile network prefixes to mobile terminals.

BACKGROUND

In a wireless network, a wireless terminal may be capable of providing other terminals with network access. For example, an integrated user equipment (UE)—e.g. a cell phone—typically obtains connectivity to a particular packet data network (PDN) via a wireless interface, such as WLAN, GPRS or LTE; and the UE also allows other terminal equipments (TEs) to attach to the UE using local connectivity technologies—e.g., IrDA, USB, and Bluetooth—and the UE grants the TEs access to the PDN. In this case, the UE and attached TEs forms a network, and may move around as a whole.

Host Based Mobility Protocols

In a host-based mobility protocol, e.g., DSMIPv6, a UE (or mobile node (MN)) typically extends its Internet Protocol (IP) stack and implements IP mobility signaling as the UE moves and changes its point of attachment. For this reason, DSMIPv6 is often referred as a client-based mobility protocol (CMIP).

FIG. 1 illustrates a conventional attach procedure 100 during which a UE 102 gains network connectivity to a home network via a foreign link (or visited network). At step 110, UE 102 performs a layer 2 specific attach procedure with an access router (AR) 104. At step 112, UE 102 performs a layer 3 specific procedure to configure an IP address on an interface of UE 102. At step 114, UE 102 initiates a bootstrapping procedure to obtain an IP address of a HA 106, if not available, using either DHCP or DNS. At step 116, UE 102 runs an IKEv2 protocol with HA 106 to establish an IPSec security association.

During step 116, UE 102 also requests a home address (HoA) or a home network prefix (HNP), and UE 102 compares the received HoA or HNP with the IP address previously configured on the interface of the UE at step 112. If they do not match, the IP address previously configured on the interface is a care-of address (CoA), and UE 102 performs steps 118, 120. In particular, at step 118, UE 102 registers the binding between the care-of address and the home address in a Binding Update message with HA 106. Upon receiving this Binding Update message, HA 106 creates a binding between the care-of address and the home address in a Binding Cache entry. At step 120, a Binding Acknowledgement message, if requested, is sent back from HA 106 to notify UE 102 of the status of the Binding Update procedure. Note that the binding update message and the binding acknowledgement message are protected by the IPSec security association established at step 116.

If at step 116 the received HoA or HNP does match the IP address previously configured on the interface of UE 102, UE 102 is at its home link and steps 118, 120 are not performed. Note that optionally UE 102 may set up an additional child SA to protect payload traffic from the UE itself. At step 414, user equipment 306 gains network connectivity and can send or receive data traffic from a correspondent node (CN) 312 at the current point of attachment via either the home address or care-of address based, e.g., on the DSMIPv6 specification.

When a UE powers up as a mobile router, in addition to the information listed above, the UE also needs to obtain a mobile network prefix from the PDN that the UE wants to access. Once obtained, the mobile network prefix is advertised or announced to the attached TEs in order for the TEs to configure an IP address for accessing such PDN. Note that the home address obtained by the mobile router may or may not be within the range of the mobile network prefix. It is possible to pre-configure the UE with a mobile network prefix; however, this results in inefficient use of a network prefixes—i.e., the network prefix would be locked to a specific UE even when the UE is powered off. Currently, there are two mechanisms that can be used for a UE to dynamically obtain such a network prefix—DHCP based prefix delegation, and MIP signaling based prefix delegation.

FIG. 2 shows a procedure 200 for a UE 202 to run DHCP to obtain a mobile network prefix from an HA 204. At step 210, UE 202 performs a layer 2 specific attach procedure with an access router (AR) 204. At step 212, UE 202 performs a layer 3 specific attach procedure to configure an IP address on an interface of UE 202. At step 214, UE 202 starts a bootstrapping procedure to obtain an IP address of HA 206, if not available, using either DHCP or DNS. At step 216, UE 202 runs an IKEv2 protocol with HA 206 to establish an IPSec security association. During this step, UE 202 also requests a home address (HoA) or a home network prefix (HNP). UE 202 compares the received HoA or HNP with the IP address previously configured on its interface.

If the received HoA or HNP does not match the IP address, the IP address configured on the interface of UE 202 at step 216 is a care-of address (CoA) and UE 202 performs steps 218, 220 as shown in box (A). That is, at step 218, UE 202 registers a binding between the care-of address and home address in a Binding Update message with HA 206. Upon receiving this Binding Update (BU) message, HA 206 creates a Binding Cache entry based on the care-of address and the home address in a Binding Cache. At step 220, a Binding Acknowledgement (BA) message, if requested, is sent back from HA 206 to notify UE 202 the status of the Binding Update procedure. (Note that BU and BA messages are protected by the IPSec security association established at step 216).

If the received HoA or HNP does match the IP address, UE 202 is at its home link and steps 218, 220 are skipped. Note that optionally UE 202 may set up an additional child SA (security association) to protect payload traffic from UE 202. At this point, UE 202 gains network connectivity and can send or receive data traffic (from a correspondent node (CN) 208) at its current point of attachment via either the home address or care-of address based on, e.g., the DSMIPv6 specification.

When UE 202 uses a DHCP based prefix delegation mechanism, UE 202 acts as a DHCPv6 requesting router (RR) and HA 206 acts as a DHCPv6 delegating router (DR) or a DHCPv6 relay agent (if other entity in the home network acts as a DHCPv6 delegating router). The information about the delegated mobile network prefix is exchanged between UE 202 and HA 206 by using an IA_PD Prefix option in the DHCPv6 message. If UE 202 does not have any active delegated prefix(es), UE 202 initiates a DHCPv6 message exchange by sending a DHCPv6 Solicit message to HA 206 (step 222), and HA 206 returns a DHCPv6 Reply message to UE 202 (step 224) (as defined in section 17 of RFC 3315 and section 12 of RFC 3633). And if UE 202 has one or more active delegated prefixes, UE 202 initiates a DHCPv6 message exchange with a DHCPv6 Confirm message as described in section 18.1.2 of RFC 3315 and section 12 of RFC 3633.

If UE 202 is at its home link, DHCP messages for prefix delegation can be exchanged between UE 202 and HA 206 directly and HA 206 must update its routing table, e.g. by specifying the next hop to the delegated prefix to be the home address of the UE 202. If UE 202 is not at its home link, DHCP messages for prefix delegation are exchanged through a tunnel between UE 202 and HA 206 and steps 226, 228 shown in box (B) must be performed. If the explicit mode is used, UE 202 registers the binding between its care-of address and home address as well as the delegated mobile network prefix in a Binding Update message with its HA 206 (step 226), as specified in Network Mobility (NEMO) Basic Support Protocol, RFC 3963. If the explicit mode is used, upon receiving this Binding Update message, HA 206 creates a Binding Cache entry based on the care-of address, the home address and the delegated home network prefix in the Binding Cache. A Binding Acknowledgement message, if requested, is sent back from HA 206 (step 228) to notify the Mobile Node the status of the Binding Update procedure.

Note that if implicit mode is used for the UE to register the binding, the HA must have to update the corresponding Binding Cache entry with the delegated mobile network prefix; however this requires an additional API/interface between DHCP protocol and MIP protocol. DHCPv6 Prefix Delegation for NEMO recommends using explicit mode. Now the attached TE can configure its IP address from the delegated mobile network prefix and obtain IP connectivity to access the PDN through the UE. Note that optionally the UE may set up an additional Child SA to protect payload traffic from/to the delegated mobile network prefix.

With the MIP signaling based prefix delegation mechanism, the Binding Update message is extended for the UE to indicate its request of a mobile network prefix and the Binding Acknowledgement message is extended for the HA to return the delegated prefix to the UE. Therefore, this mechanism is only useful when the UE attaches to a foreign link because when the UE attaches to its home link, there is no any BU/BA message exchange. FIG. 3 shows a procedure 300 for a UE 302 to run MIP signaling to obtain a mobile network prefix from an HA 306.

At step 310, the UE performs the layer 2 specific attach procedure with a local access router (AR) 304. At step 312, the UE then performs a layer 3 specific procedure to configure an IP address on its interface. At step 314, the UE then starts a bootstrapping procedure to obtain the IP address of the home agent, if not available, using either DHCP or DNS. At step 316, the UE runs an IKEv2 protocol with the home agent to establish the IPSec security association. During this step, the UE also requests a home address (HoA) or a home network prefix (HNP). Then the UE compares the received HoA or HNP with the IP address previously configured on its interface during step 312. If they do not match, the IP address configured on the UE's interface at step 2) is a care-of address; otherwise, the UE is at its home link and the IP address configured on the UE's interface at step 2) is a home address. In this case, we assume that the UE is not at its home link in order to demonstrate the procedure of MIP signaling based prefix delegation. Note that optionally the UE may set up an additional Child SA to protect payload traffic from the UE itself.

Tat step 318, the UE registers a binding between its care-of address and home address and also requests a mobile network prefix by including a Mobile Network Prefix request option in a Binding Update message with its home agent. Upon receiving this Binding Update message, the HA verifies the request of the UE and assigns a mobile network prefix, if the request is valid. The HA creates a Binding Cache entry based on the care-of address, the home address and the delegated mobile network prefix in the Binding Cache. A Binding Acknowledgement message must be sent back from the HA to notify the Mobile Node the status of the Binding Update procedure and the delegated mobile network prefix (carried in the MNP option) (step 320). Note that BU and BA messages are protected by the IPSec security association established at step 316. Now, the UE gains network connectivity and it can send or receive data traffic (from a correspondent node (CN) 308) at its current point of attachment via its care-of address based on the DSMIPv6 specification. Furthermore, the attached TE can configure its IP address from the delegated mobile network prefix and obtain IP connectivity to access the PDN through the UE. Note that optionally the UE may set up an additional Child SA to protect payload traffic from/to the delegated mobile network prefix.

Prefix Delegation Support for Mobile Networks describes another prefix delegation mechanism that combines both DHCP based and MIP signaling based prefix delegation mechanisms, which mechanism is illustrated by procedure 400 in FIG. 4. With this mechanism, the UE does not act as a requesting router, but requests a MNP using an extended Binding Update message (step 408); and the HA acts as a requesting router and requests prefix delegation using DHCP messages from a DHCP server (i.e., a delegating router) (steps 410, 412, 414, 416), and returns the delegated prefix back to the UE in the Binding Acknowledgement message (step 418).

Network Based Mobility Protocols

A UE can also establish connectivity to a certain PDN by using network based mobility protocols, such as GTP and PMIP.

FIG. 5 shows a procedure 500 in which a UE 502 establishes network connectivity by using PMIP. Different from the procedure of using host based mobility protocols, PMIP does not require the UE to be involved in mobility signaling; instead, an entity called Media Access Gateway (MAG) (e.g., MAG 504) acquires the home network prefix (either from the policy profile or from the home agent (also called Local Mobility Anchor (LMA))) (LMA 506), and then emulates the UE's home link. The UE configures its home address from the home network prefix acquired by the MAG (step 510). The MAG also acts as a proxy agent to setup connectivity for UE with the LMA by sending a Proxy Binding Update message (step 512), and receiving the Proxy Binding Acknowledgement message (step 514). Upon the completion of this procedure, a mapping between the Care of address of MAG and the home address of UE is created at the LMA, which enables the LMA to forward the packets destined at the UE to the appropriate MAG (via tunnel 516). With the DHCP based prefix delegation mechanism, the UE, after receiving the home address/home network prefix from the MAG, sends a DHCPv6 message to request a mobile network prefix. The MAG acts as a DHCPv6 relay and forwards such message to the LMA that acts as a DHCP server, and returns an allocated mobile network prefix to the UE via the MAG.

FIG. 6 shows a procedure 600 of how connectivity is established through GTP. The detailed procedure is described in 3GPP TS 23.401. By default, when the UE requests an IPv6 home address, the UE performs a stateless IPv6 address configuration after initial attach by sending a Router Solicitation message to the PDN GW and receiving a Router Advertisement message from the PDN GW. After address configuration, the UE can request prefix delegation by acting as a DHCPv6 client and exchanges DHCPv6 messages with the PDN GW that acts as a DHCP server.

As described above in connection with host based mobility protocols, a UE can use DHCP based and MIP signaling based prefix delegation mechanisms to obtain a mobile network prefix. Such mechanisms may be suitable in the case that the TE does not attach to the UE to access network initially when the UE powers up, but attaches later. However, it is quite common that there are TEs waiting for network access before the UE activates its wireless interface to obtain network connectivity. In this case, it is important for the UE to obtain a mobile network prefix as soon as possible in order to reduce the delay for TE's waiting time.

When the UE is at its home link, the UE cannot use MIP signaling based prefix delegation mechanism; on the other hand, when the UE is not at its home link and the UE uses DHCP based prefix delegation mechanism, either additional BU/BA message exchange is needed or an additional API/interface between the DHCP protocol and the MIP protocol needs to be implemented. Furthermore, if the user traffic between TEs and the HA needs to be protected by IPSec and the security association established before is only for the traffic from/to the UE itself, but not for the traffic to/from the allocated mobile network prefix, either an additional IPSec Child SA is needed or the traffic from/to the mobile network prefix is encapsulated by the IP header firstly and then processed by the previously established security association, which results in significant overhead. Third, with both mechanisms, the UE cannot obtain its home address and one or more mobile network prefixes at the same time. Therefore, typically the HA does not know whether the UE needs a mobile network prefix or not when the UE establishes the IPSec SA with the HA and the mobile network prefix returned to the UE later will likely not include the home address (e.g., a /64 IPv6 HNP) assigned to the UE before. is because otherwise the HA will have to avoid allocating any address/prefix from the corresponding shorter (e.g., a /48 IPv6 prefix) prefix to other UEs, which results in insufficient use of network resources. There are certain benefits if the home address falls into the range of the allocated MNP, for example, the UE only needs one IPSec Child SA to protect the traffic from/to the UE and the TEs. Prefix delegation mechanisms should not exclude such kind of configuration.

Besides these two mechanisms, the following existing approaches might be relevant to this topic. *MIP6 Bootstrapping in Split Scenario* (RFC 5026) defines an attribute, called MIP6_HOME_PREFIX, to be used in IKEv2 Configuration Payload messages to carry the home network prefix from which the Mobile Node auto-configures its home address. However, this attribute cannot be used for requesting and returning the mobile network prefix; otherwise it would cause confusion.

*Internet Key Exchange (IKEv2) Protocol* (RFC 4306), and *IKEv2 Clarifications and Implementation Guidelines*, (RFC 4718) defines another attribute—called INTERNAL_IP6_SUBNET. Such attribute can be used in IKEv2 CFG_REPLY payload to indicate a network prefix. However, using this attribute for mobile network prefix delegation has the following drawbacks. First, such attribute intends to indicate what prefix is accessible through an IPSec gateway (without link boundary), and together with the Traffic Selector payload (such as TSr), whether an IPSec SA is needed to access this prefix and if so, whether the IPSec SA to be created or a new IPSec SA should be used for this purpose, based on the operator's policy; therefore, this attribute cannot be used for mobile network prefix delegation. Second, there is no clear meaning when using this attribute in the CFG_REQUEST message; RFC 4718 recommends not including this attribute in the CFG_REQUEST payload.

For the similar reasons, the attributes of INTERNAL_IP4_NETMASK and INTERNAL_IP6_NETMASK cannot be used for this purpose either. Furthermore, there are no corresponding payloads for prefix delegation in network based mobility signaling messages and stateless IP address configuration messages.

SUMMARY

In general, in one aspect, this specification describes a method and apparatus for dynamically allocating a mobile network prefix to a mobile terminal, in which the mobile terminal is associated with a user equipment. The method includes sending a message from the user equipment to a home agent to establish a security association between the user equipment and the home agent. The message includes a request for a mobile network prefix to be assigned to the mobile terminal equipment. The method further includes the home agent allocating a mobile network prefix to be assigned to the mobile terminal equipment, and assigning the allocated mobile network prefix to the mobile terminal equipment.

Using techniques described herein, a UE can request the mobile network prefix when powering up, which shortens the wait time needed by a TE for network connectivity. A UE can set up one child SA to protect payload packets to/from both the UE and the TEs when powering up, which reduces signaling overhead resulted from setting up an additional Child SA. With new payloads/options proposed for GTP and PMIP signalling messages and Router Solicitation/Router Advertisement messages, a mobile node reduces signalling overhead during the procedure to obtain IP connectivity and a delegated network prefix either during initial attach or during handover.

BRIEF DESCRIPTION OF THE DRAWINGS

FIG. 3 illustrates a conventional attach procedure when a UE acts as a mobile router and uses a MIP signaling based prefix delegation mechanism.

FIG. 4 illustrates a conventional combined prefix delegation mechanism.

Like reference symbols in the various drawings indicate like elements.

DETAILED DESCRIPTION

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. In general, steps within a method may be executed in different order without altering the principles of the present disclosure.

Prefix Delegation Mechanism Using Host Based Mobility Protocol

This invention proposes new attributes to be used in IKEv2 Configuration Payload. Such attributes can be used by a UE to request a mobile network prefix in the CFG_REQUEST payload and by a HA or PDN GW to return an allocated mobile network prefix to the UE. Once the UE receives and advertise such a mobile network prefix to the attached TE, the TE can configure its IP address from this mobile network prefix and therefore obtains IP connectivity to the PDN. The following discussion describes different ways to define such new configuration attributes in IKEv2.

Figure 1:
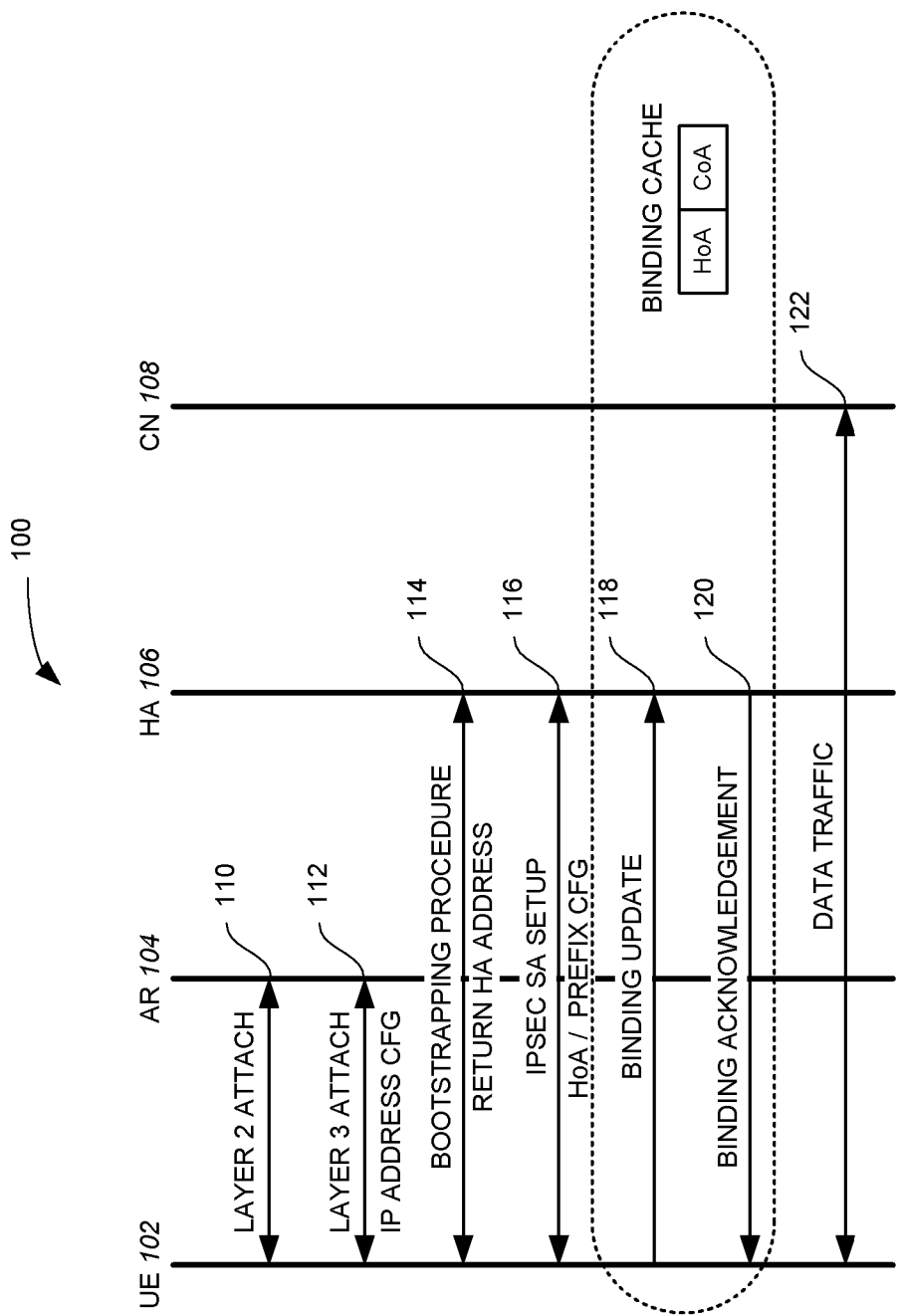
FIG. 1 illustrates a conventional attach procedure when a UE attaches to a network as a mobile node.
Figure 2:
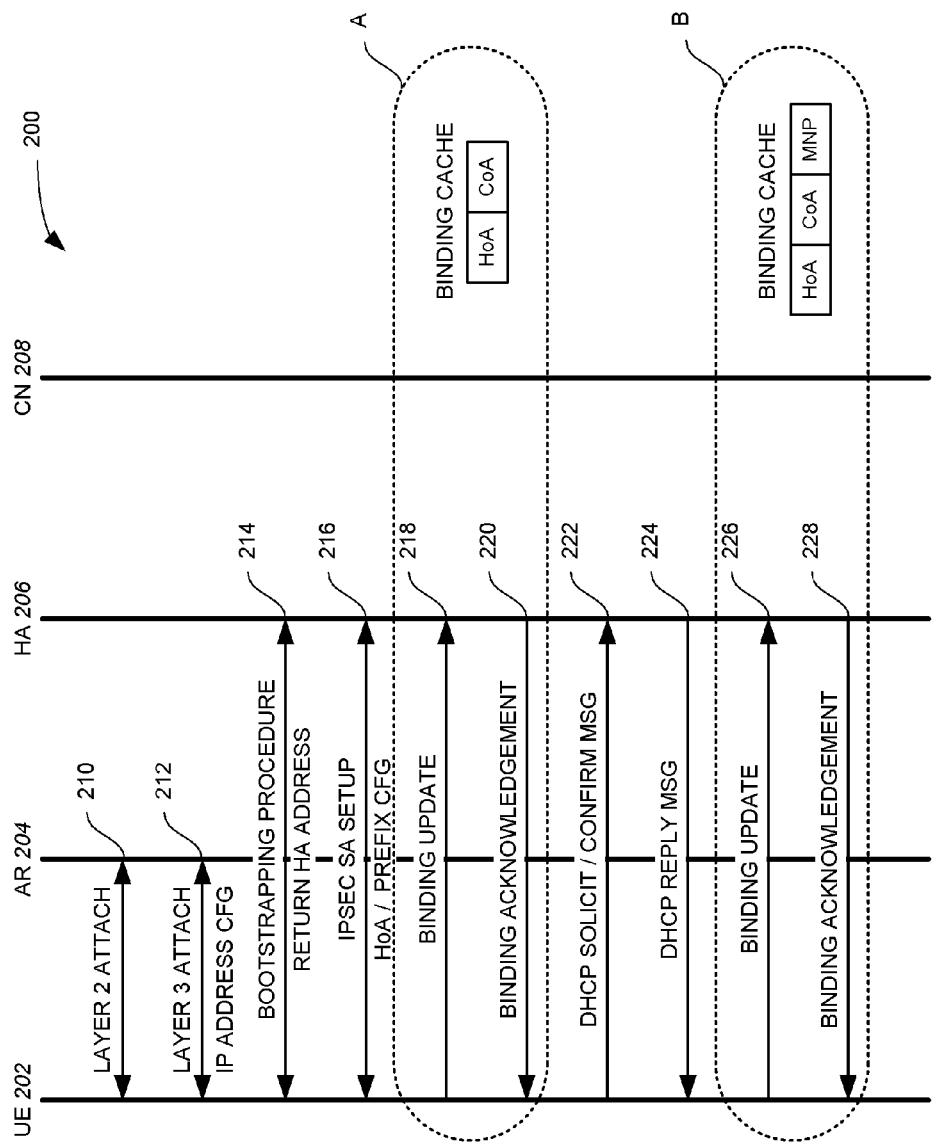
FIG. 2 illustrates a conventional attach procedure when a UE acts as a mobile router and uses a DHCP based prefix delegation mechanism.
Figure 5:
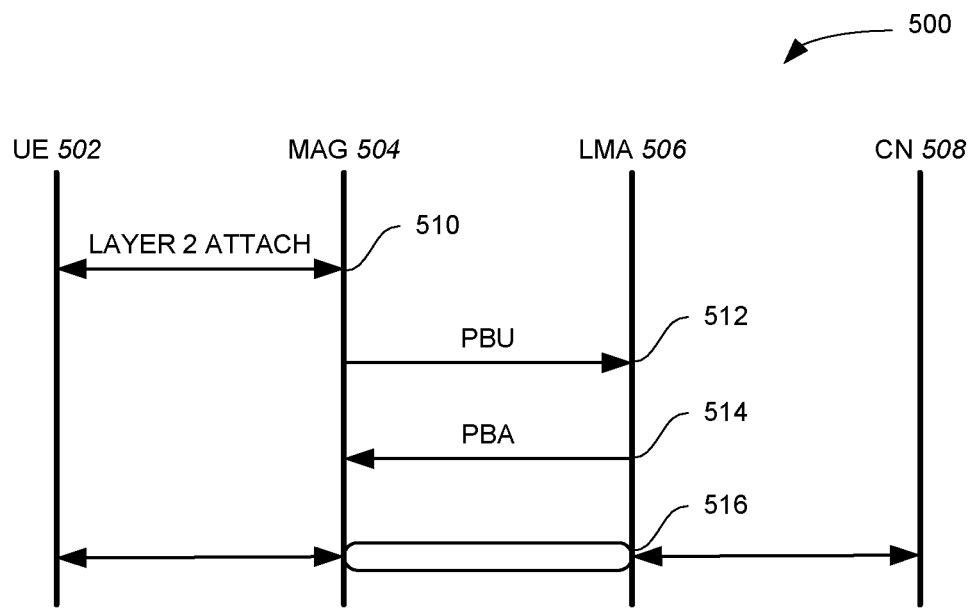
FIG. 5 illustrates a conventional procedure for establishing IP connectivity using PMIP.
Figure 6:
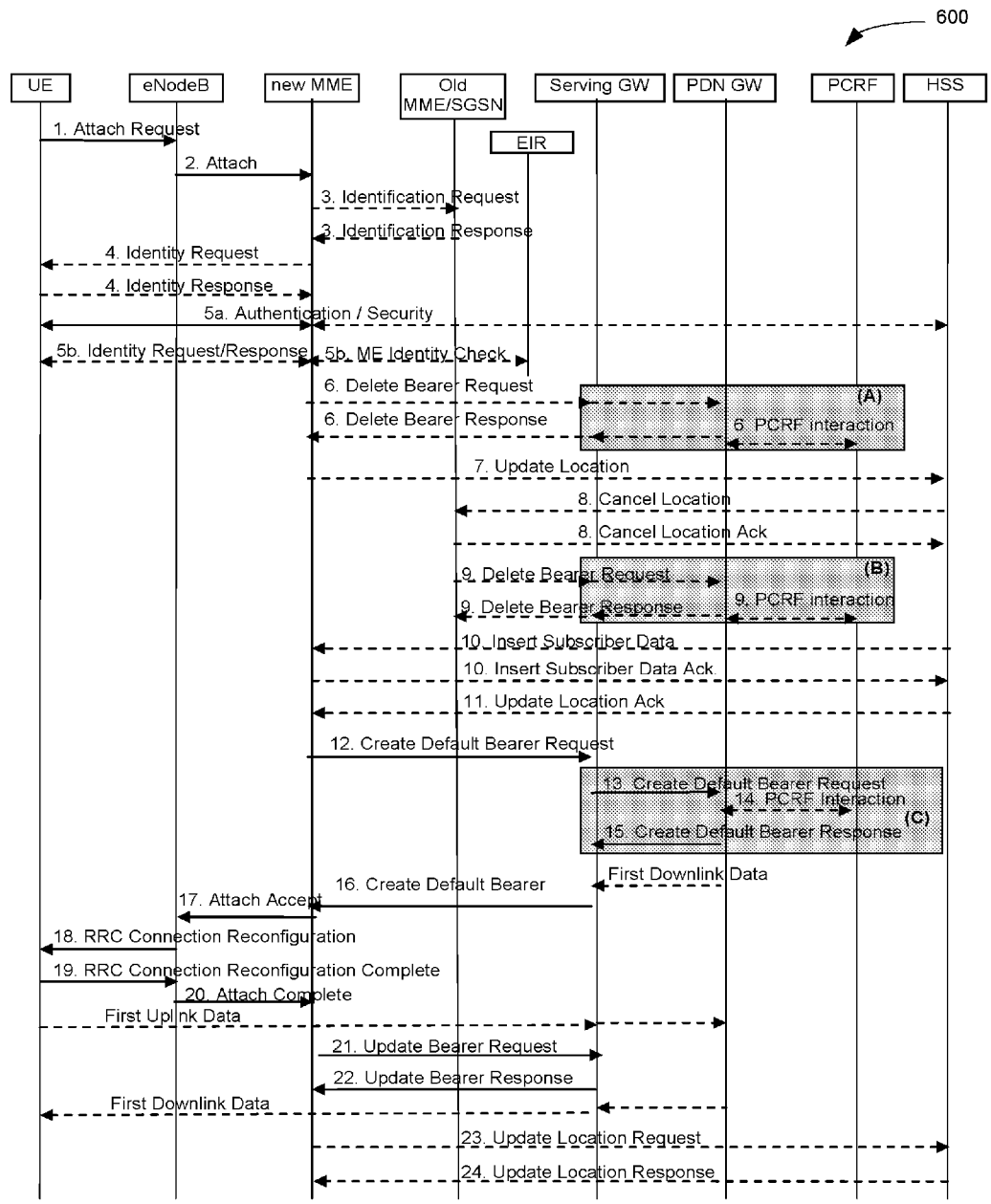
FIG. 6 illustrates a conventional procedure for establishing IP connectivity using GTP.
Figure 7:
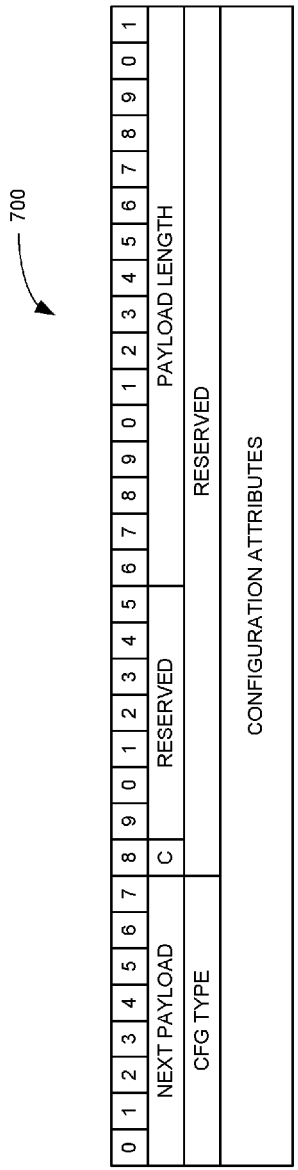
FIG. 7 illustrates an example configuration payload format.

IKEv2 defines various configuration payloads to exchange configuration information between IKE peers. FIG. 7 shows a format 700 of a configuration payload. CFG Type could be one of a CFG_REQUEST, CFG_REPLY, CFG_SET, and CFG_ACK. In the following, we use CFG_REQUEST/CFG_REPLY for mobile network prefix delegation.

Figure 8:
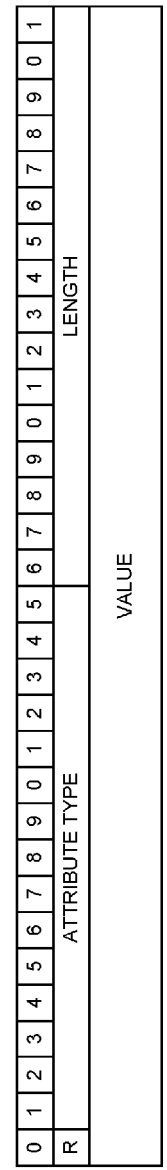
FIG. 8 illustrates an example configuration attribute format.

FIG. 8 shows a format 800 of a configuration attribute. Table 1 below describes various configuration attributes.

TABLE 1

| Attribute Type | Value | Multi-Valued | Length | |
|---|---|---|---|---|
| MOBILE_NETWORK_PREFIX4 | 16 | YES* | 0 or 8 octets | This attribute is made up of two fields: the first is an IP address and the second is a netmask. Multiple sub-networks MAY be requested. When used in the CFG_REQUEST, this attribute is either zero-length or contains a UE-preferred network prefix. The responder MAY respond with zero or more sub-network attributes. |
| MOBILE_NETWORK_PREFIX6 | 17 | YES* | 0 or 17 octets | This attribute is made up of two fields: the first is a sixteen-octet IPv6 address and the second is a one-octet prefix-length. Multiple sub-networks MAY be requested. When used in the CFG_REQUEST, this attribute is either zero-length or contains a UE-preferred network prefix. The responder MAY respond with zero or more sub-network attributes. |
| MOBILE_PREFIX_EXPIRY | 18 | NO | 0 or 4 octets | Specifies the number of seconds that the UE can use the mobile network prefix. The host MUST renew the mobile network prefix |

TABLE 1-continued

| Attribute Type | Value | Multi-Valued | Length |
|---|---|---|---|
| | | | before this expiry time. Only one of these attributes MAY be present in the reply. |

*These attributes may be multi-valued on return only if multiple values were requested.

The mobile network prefix attributes—MOBILE_NETWORK_PREFIX4 and MOBILE_NETWORK_PREFIX6 attributes—are used to carry IPv4 and IPv6 prefix respectively and the MOBILE_PREFIX_EXPIRY specifies the lifetime of the allocated mobile network prefix. Note that the values of such new Attribute Types are allocated by IANA and here we just use these numbers for illustration purpose.

Figure 9:
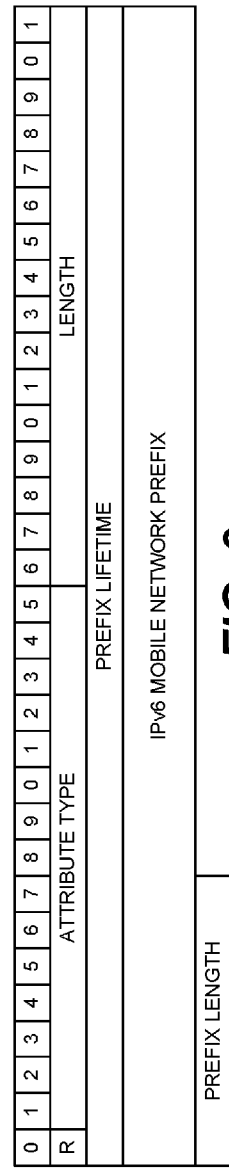
FIG. 9 illustrates an example format for a MOBILE_NETWORK_PREFIX6 attribute.

Alternatively, the formats 900, 1000 for new MOBILE_NETWORK_PREFIX6 (FIG. 9) and MOBILE_NETWORK_PREFIX4 (FIG. 10) configuration attributes can be used. As shown in FIG. 9, the format 900 includes the following fields: Reserved (1 bit)—This bit can be set to zero and be ignored on receipt; Attribute Type (15 bits)—A unique identifier for the MOBILE_NETWORK_PREFIX6 attribute (decided by IANA, for example it could be 17); Length (2 octets)—Length in octets of Value field (IPv6 Mobile Network Prefix, Prefix Lifetime and Prefix Length), this can be 0 or 21; Prefix Lifetime (4 octets)—The lifetime of the IPv6 Mobile Network Prefix; IPv6 Mobile Network Prefix (16 octets)—The delegated IPv6 Mobile Network Prefix; Prefix Length (1 octet)—The length in bits of the IPv6 Mobile Network Prefix specified in the field of IPv6 Mobile Network Prefix.

Figure 10:
FIG. 10 illustrates an example format for a MOBILE_NETWORK_PREFIX4 attribute.

Referring to FIG. 10, the format 1000 includes the following fields: Reserved (1 bit)—This bit can be set to zero and ignored on receipt; Attribute Type (15 bits)—unique identifier for the MOBILE_NETWORK_PREFIX4 attribute (decided by IANA, for example it could be 16); Length (2 octets)—Length in octets of Value field (IPv4 Mobile Network Prefix, Prefix Lifetime and Prefix Length), this can be 0 or 9; Prefix Lifetime (4 octets)—The lifetime of the IPv4 Mobile Network Prefix; IPv4 Mobile Network Prefix (4 octets)—The delegated IPv4 Mobile Network Prefix; Prefix Length (1 octet)—The length in bits of the IPv4 Mobile Network Prefix specified in the field of IPv4 Mobile Network Prefix.

Figure 11:
FIG. 11 illustrates an example format for a MOBILE_NETWORK_PREFIX attribute in accordance with one implementation of the invention.

Another way is to define a new configuration attribute—called Mobile_Network_Prefix—is shown by format 1100 in FIG. 11. The format 1100 includes the following fields: Reserved (1 bit)—This bit can be set to zero and be ignored on receipt; Attribute Type (15 bits)—A unique identifier for the MOBILE_NETWORK_PREFIX attribute (decided by IANA, for example it could be 16); Length (2 octets)—Length in octets of Value field (Mobile Network Prefix, Prefix Lifetime and Prefix Length). This can be 0 or 9 or 21; Prefix Lifetime (4 octets)—The lifetime of the Mobile Network Prefix; Mobile Network Prefix (4 or 16 octets)—The delegated Mobile Network Prefix, either IPv4 or IPv6; Prefix Length (1 octet)—The length in bits of the Mobile Network Prefix specified in the field of Mobile Network Prefix. In this case, the Length field can be used to detect that a delegated mobile network prefix is an IPv4 or IPv6 prefix.

The lifetime of an allocated MNP (mobile network prefix) can be also associated with the lifetime of the IKE SA between a UE and an HA. In this case, if the IKE SA expires, the allocated MNP also expires. Note that similarly, new Notify payloads can also be defined to carry such information and it is also possible to use different messages in the following procedure.

Attach Procedure when UE Initially Powers Up as a Mobile Router

Figure 12:
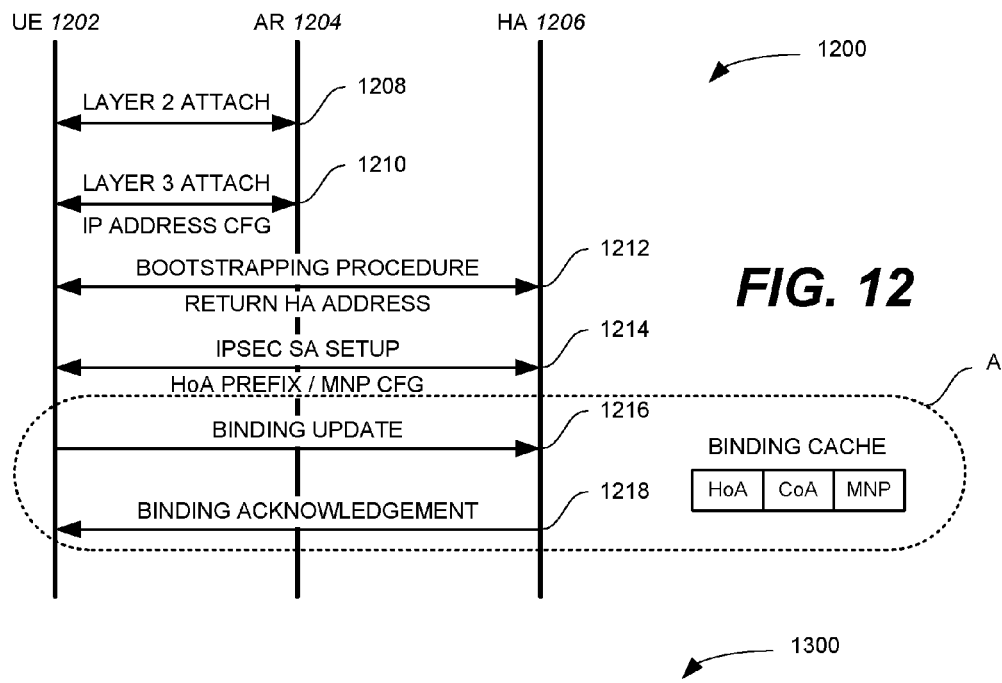
FIG. 12 illustrates an example attach procedure when a UE initially powers up as a mobile router.

With these new contribute attributes, a UE can request and receive, if authorized, one or more mobile network prefixes during bootstrapping and acts as a mobile router for other TEs. FIG. 12 shows such an attach procedure 1200. At step 1208, a UE 1202 performs a layer 2 specific attach procedure with a local AR 1204. At step 1210, the UE then performs the layer 3 specific procedure to configure an IP address on its interface. At step 1212, the UE then starts the bootstrapping procedure to obtain the IP address of an HA 1206, if not available, using either DHCP or DNS. At step 1214, the UE runs the IKEv2 protocol with the home agent to establish an IPSec security association. During this step, the UE also requests a home address (HoA) or a home network prefix (HNP). Then the UE compares the received HoA or HNP with the IP address previously configured on its interface during step 1210. If they do not match, the IP address configured on the UE's interface at step 2) is a care-of address and the UE performs steps 1216, 1218 as shown in box (A); otherwise, the UE is at its home link and steps 1216, 1218 are skipped.

Figure 13:
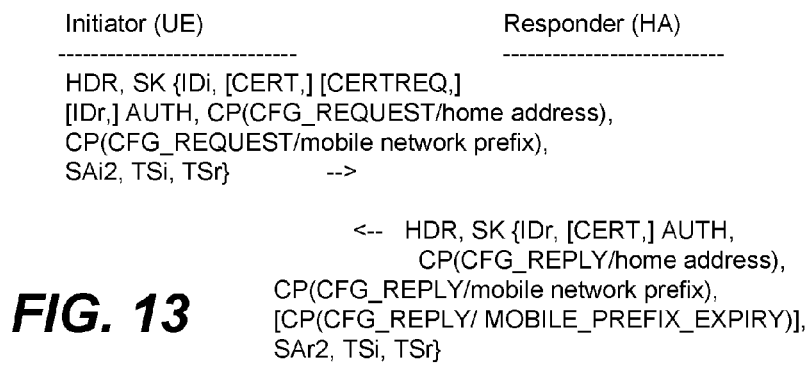
FIG. 13 illustrates an IKE_AUTH exchange including new attributes.

If the UE knows that the UE needs to obtain a mobile network prefix for TEs, (in one implementation) the UE includes a CFG-REQUEST payload with the attribute type of either MOBILE_NETWORK_PREFIX4 (if requesting IPv4 prefix) or MOBILE_NETWORK_PREFIX6 (if requesting IPv6 prefix) in the first message sent during the IKE_AUTH exchange. The HA verifies whether such request is valid based on its policy. If valid, the HA allocates a mobile network prefix either from a local address/prefix pool or by contacting a DHCP server. Such mobile network prefix is returned in the CFG_REPLY payload in the second message sent during the IKE_AUTH exchange. Optionally, the HA may specify the validity period of this allocated network prefix in the MOBILE_PREFIX_EXPIRY attribute. If the HA does not return the MOBILE_PREFIX_EXPIRY attribute, the UE assumes that the mobile network prefix expires when the current IKE SA expires. Note that the UE may request multiple mobile network prefixes by using multiple CFG_REQUEST payloads and these mobile network prefixes have the same lifetime. FIG. 13 shows the details of IKE_AUTH exchange 1300 with proposed attributes.

Referring back to FIG. 12, at step 1216, the UE registers the binding between its care-of address and home address together with its mobile network prefix by sending a Binding Update message to its home agent. The HA creates a Binding Cache entry based on the care-of address, the home address and the delegated mobile network prefix in the Binding Cache. At step 1218, a Binding Acknowledgement message must be sent back from the HA to notify the Mobile Node the status of the Binding Update procedure. Note that BU and BA messages are protected by the IPSec security association established at step 1214.

Figure 14:
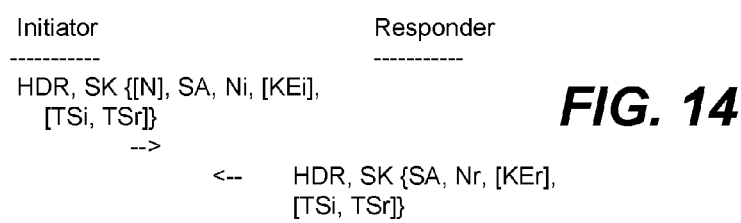
FIG. 14 illustrates a CREATE_CHILD_SA exchange.

Now, the UE gains network connectivity and it can send or receive data traffic at its current point of attachment via its home address or care-of address based on the DSMIPv6 specification. Furthermore, the attached TE can configure its IP address from the delegated mobile network prefix and obtain IP connectivity to access the PDN through the UE. Optionally, in order to protect the traffic to/from the UE itself and the TE, the UE initiates the CREATE_CHILD_SA exchange to set up an additional Child SA to protect payload traffic from/to the delegated mobile network prefix and its home address. The details of a CREATE_CHILD_SA exchange 1400 are shown in FIG. 14. Note that if the mobile network prefix includes the home address (HNP), the UE just needs one traffic selector indicating the mobile network prefix in the TSi payload; otherwise, the UE needs to two traffic selectors to indicate both the mobile network prefix and the home address in the TSi payload.

Attach Procedure when UE Initially Powers Up as a Mobile Node

Figure 15:
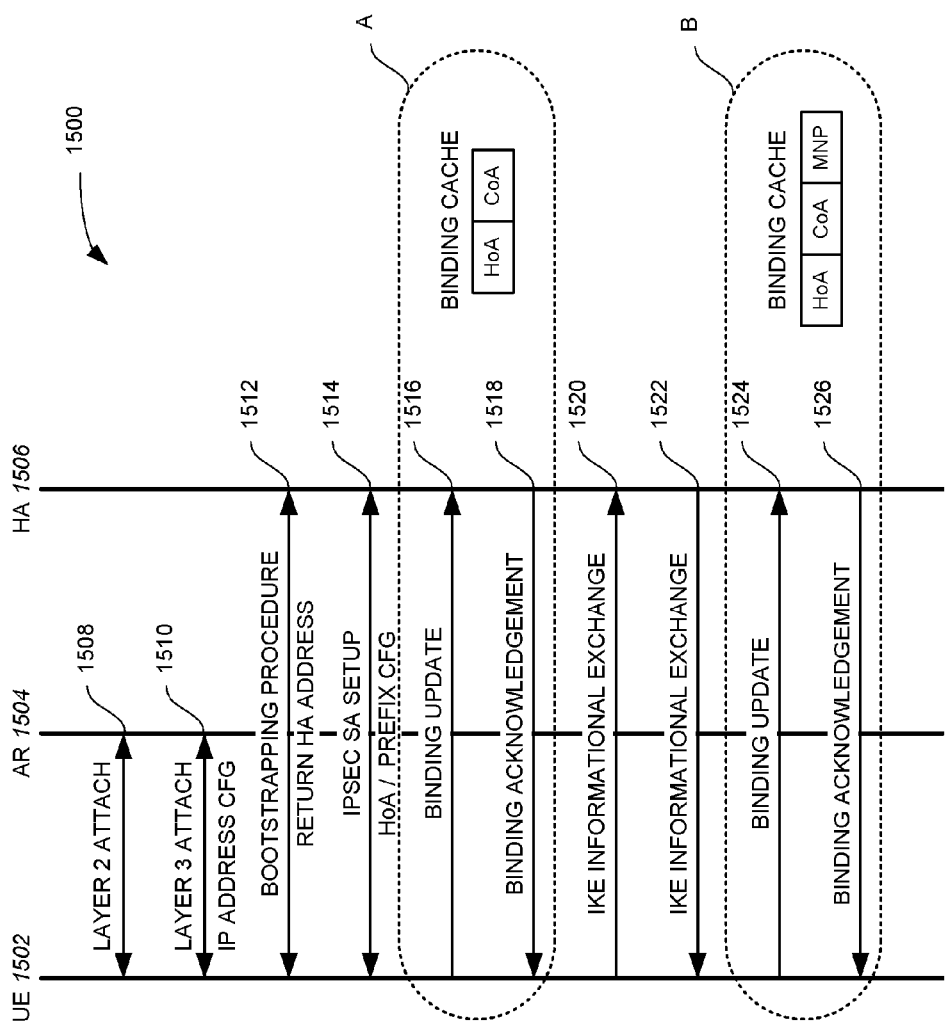
FIG. 15 illustrates an example attach procedure when a UE initially powers up as a mobile node.

With these new Contribute Attributes, a UE can request and receive, if authorized, one or more mobile network prefixes after bootstrapping and acts as a mobile node for other TEs. FIG. 15 shows such an attach procedure 1500. In particular, at step 1508, a UE 1502 performs a layer 2 specific attach procedure with a local AR 1504. At step 1510, the UE then performs the layer 3 specific procedure to configure an IP address on its interface. At step 1512, the UE then starts the bootstrapping procedure to obtain the IP address of a home agent (HA 1506), if not available, using either DHCP or DNS. At step 1514, the UE runs the IKEv2 protocol with the home agent to establish the IPSec security association. During this step, the UE also requests a home address (HoA) or a home network prefix (HNP). Then the UE compares the received HoA or HNP with the IP address—i.e., the IP address previously configured on its interface during step 1510. If they do not match, the IP address configured on the UE's interface at 1510 is a care-of address and the UE performs steps 1516, 1518 as shown in box (A); otherwise, the UE is at its home link and steps 1516, 1518 are skipped. Note that optionally the UE may set up an additional Child SA to protect payload traffic from the UE itself.

At step 1516, the UE registers the binding between its care-of address and home address in a Binding Update message with its home agent. Upon receiving this Binding Update message, the HA creates a Binding Cache entry based on the care-of address and the home address in the Binding Cache. At step 1518, a Binding Acknowledgement message, if requested, is sent back from the HA to notify the Mobile Node the status of the Binding Update procedure. Note that BU and BA messages are protected by the IPSec security association established at step 4). Now, the UE gains network connectivity and the UE can send or receive data traffic at its current point of attachment via either its home address or care-of address based on the DSMIPv6 specification. Later, a TE may attach to the UE and request IP connectivity to the same PDN.

At step 1520, the UE initiates the IKEv2 Informational Exchange with the HA to request a mobile network prefix by including one or more MOBILE_NETWORK_PREFIX4 or MOBILE_NETWORK_PREFIX6 attribute in the CFG_REQUEST payload. At step 1522, the HA verifies the request of the UE and returns one or more mobile network prefixes to the UE by using one or more MOBILE_NETWORK_PREFIX4 or MOBILE_NETWORK_PREFIX6 attribute in the CFG_REPLY payload. In addition, a MOBILE_PREFIX_EXPIRY attribute may be used to indicate the lifetime of such prefixes. In one implementation, the messages exchanged during the IKEv2 Informational Exchange are protected by the previously established IKE SA. The UE registers the binding between its care-of address and home address together with its mobile network prefix by sending a Binding Update message to its home agent (step 1524).

The HA updates the corresponding Binding Cache entry based on the care-of address, the home address and the delegated mobile network prefix in the Binding Cache. At step 1526, a Binding Acknowledgement message is sent back from the HA to notify the Mobile Node the status of the Binding Update procedure. Note that, in one implementation, BU and BA messages are protected by the IPSec security association established at step 1514. Now, the attached TE can configure its IP address from the delegated mobile network prefix and obtain IP connectivity to access the PDN through the UE. Optionally, in order to protect the data traffic, the UE can initiate the CREATE_CHILD_SA exchange to set up an additional Child SA. If the UE has not set up a child SA to protect the traffic to/from the UE itself, the UE can initiate the establishment of a child SA for the traffic to/from both the TE and the UE itself. Otherwise, the UE needs to either modify the already set up child SA to protect the traffic from/to both the UE and the TE or set up a new Child SA for the traffic from/to the TE only. The details of the CREATE_CHILD_SA exchange are shown in FIG. 14.

Prefix Delegation Mechanism when Using a Network Based Mobility Protocol

Figure 16:
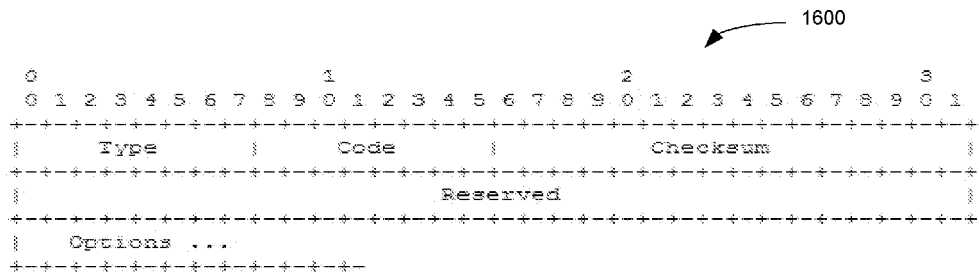
FIG. 16 illustrates an example format of a router solicitation message.
Figure 17:
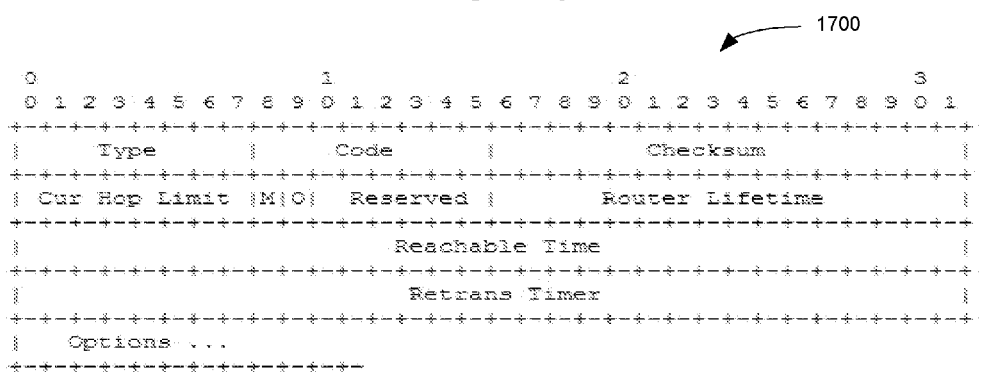
FIG. 17 illustrates an example format of a router advertisement message.

The present disclosure also proposes new payloads/options to be used in the GTP/PMIP signaling messages as well as the Router Solicitation message and the Router advertisement message. Such new payloads/options can be used by a UE to request and receive one or more mobile network prefixes. FIGS. 16 and 17 respectively show formats of a Router Solicitation message 1600 and a Router Advertisement message 1700. A description of each field within these messages can be found in RFC 2461.

Figure 18:
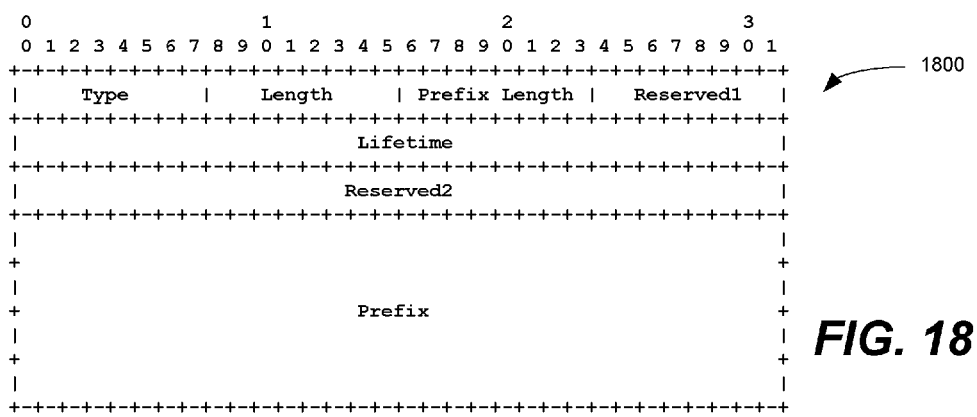
FIG. 18 illustrates an example format of a prefix delegation option which can be included in a router solicitation message and/or a router advertisement message.

A new option is disclosed herein—called prefix delegation option—which can be included in a Router Solicitation message and a Router Advertisement message. A format 1800 of the prefix delegation option is shown in FIG. 18. The format 1800 includes the following fields: Type—6 (The actual value will be assigned by IANA); Length—4; Prefix Length—8-bit unsigned integer (the number of leading bits in the Prefix that are valid). The value ranges from 0 to 128; Reserved1—6-bit unused field. It MUST be initialized to zero by the sender and MUST be ignored by the receiver; Lifetime—32-bit unsigned integer. The length of time in seconds (relative to the time the packet is sent) that the delegated prefix is valid. A value of all one bits (0xffffffff) represents infinity; Prefix—An IP delegated prefix of an IP address. The Prefix Length field contains the number of valid leading bits in the prefix. The bits in the prefix after the prefix length are reserved and MUST be initialized to zero by the sender and ignored by the receiver; Description—The Prefix Delegation option can be used for nodes to indicate the preferred delegated prefix (e.g. a previously allocated prefix during handover) and for the network to provide nodes with a delegated prefix. In general, The Prefix Delegation option can appear in Router Solicitation/Advertisement packets.

Figure 19:
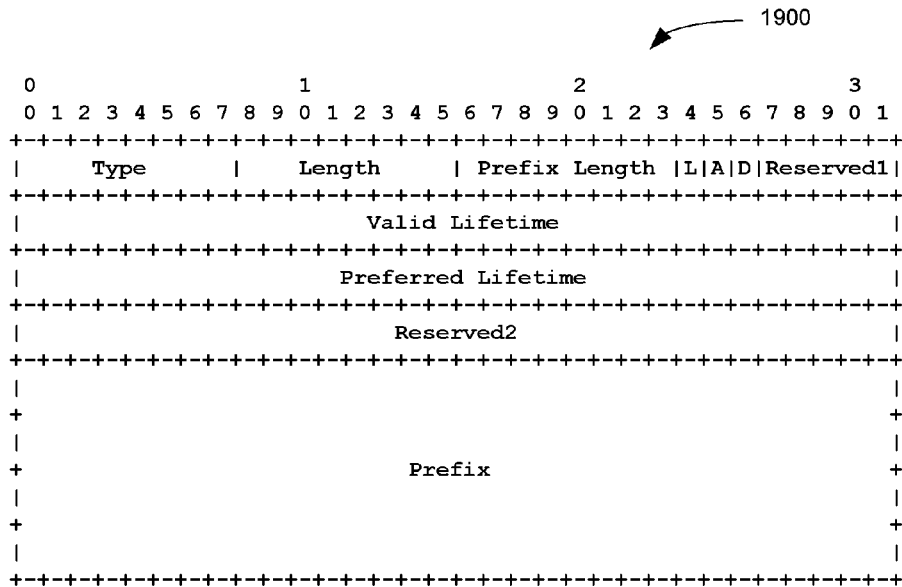
FIG. 19 illustrates an example format of a prefix delegation option including a "D" flag.

An alternative way is to define a new flag in the existing Prefix Information option. FIG. 19 illustrates a format 1900 including such a flag—called "D" flag—in the extended Prefix Information option. The "D" flag can be represented by 1-bit on-link flag. When set, indicates that this prefix is a delegated prefix. Note that it is possible to request/receive multiple delegated prefixes, for example, by including multiple prefix delegation options in the Router Solicitation/Router Advertisement messages. Note that there are other possible ways to define an option for prefix delegation.

Format of New Options for PBU/PBA Messages

Figure 20:
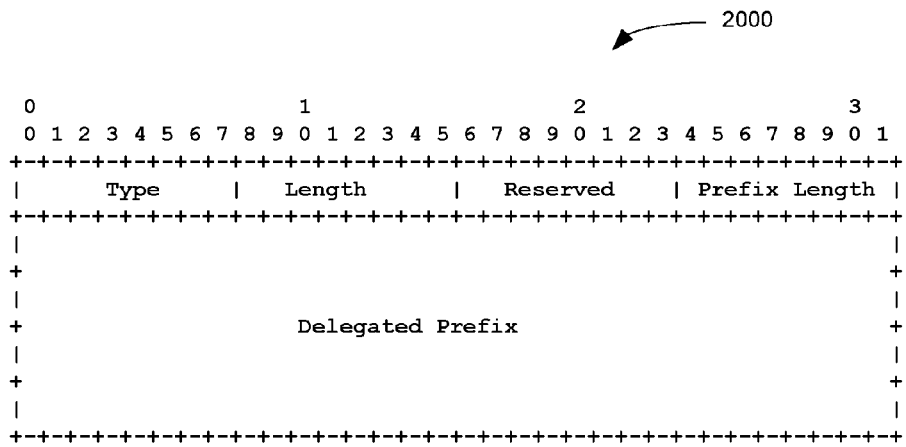
FIG. 20 illustrates an example format for PBU/PBA messages.

A new mobility option is disclosed herein—called Delegated Prefix option—to request/carry a delegated network prefix. A format 2000 of such an option is shown in FIG. 20. The fields of format 2000 includes: Type—<IANA>; Length—8-bit unsigned integer indicating the length of the option in octets, excluding the type and length fields. This field MUST be set to 18; Reserved—This 8-bit field is unused for now. The value MUST be initialized to 0 by the sender and MUST be ignored by the receiver; Prefix Length—8-bit unsigned integer indicating the prefix length of the IPv6 prefix contained in the option; Delegated Prefix—A sixteen-byte field containing a requested or allocated delegated prefix (if the Delegated Prefix is set as zero, this means requesting a new delegated prefix).

New Fields or Options for GTP Messages

There are two ways to enable GTP signaling messages for prefix delegation, i.e. using a new field or a new PCO (Protocol Configuration Option). The use of either a new field or a new PCO in the same procedure described in greater detail below.

Procedure of Prefix Delegation Using PMIP

Figure 21:
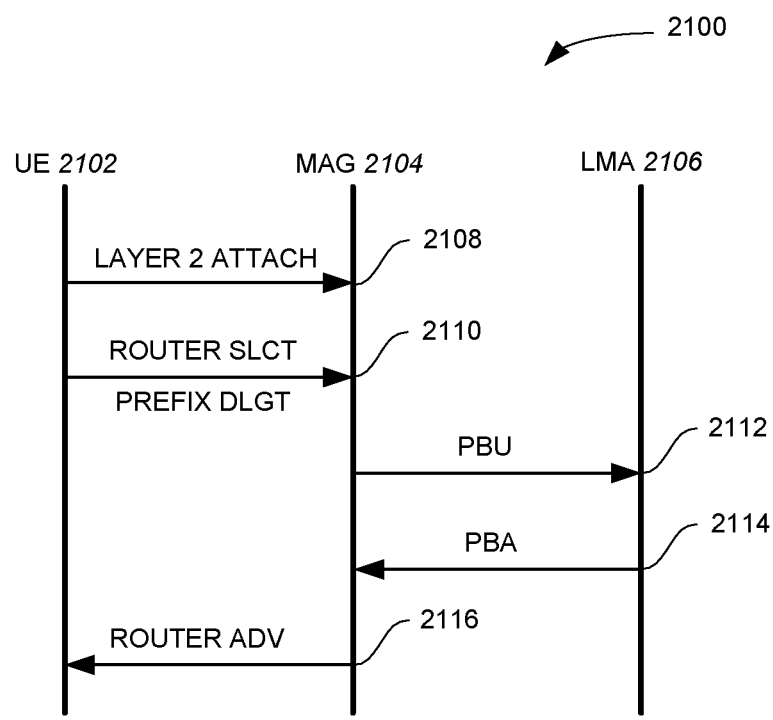
FIG. 21 illustrates an example procedure of prefix delegation during initial attach/handover using PMIP.

FIG. 21 illustrates an attach procedure 2100 corresponding to prefix delegation during initial attach/handover using PMIP. At step 2108, a UE 2102 initially attaches or hands over to an access network and performs the access network specific layer 2 procedure. At step 2110, the UE may send a Router Solicitation message to the MAG 2104 in the access network to trigger an IP address/delegated prefix configuration procedure. The request of a delegated prefix in a Router Solicitation message can be indicated by either including prefix delegation option(s) or using "D" flag in the Prefix Information option. Even without sending a Router Solicitation, the layer 2 attach performed at step 2108 can also trigger the MAG to send a PBU message to an LMA 2106. Based on the user profile or the indication from the Router Solicitation message, if received at the step 2110, the MAG can know whether to include a Delegated Prefix option in the PBU message for prefix delegation.

The LMA receives and verifies such a PBU message. If valid, the LMA includes a delegated prefix in the Delegated Prefix option together with home network prefix in the PBA message and sends this PBA message to the MAG (step 2104). The MAG advertises the delegated prefix and home network prefix received in the PBA message (step 2116). The UE performs the stateless IP address configuration based on received home network prefix and also configures the delegated prefix for other TEs to obtain IP connectivity.

Figure 22:
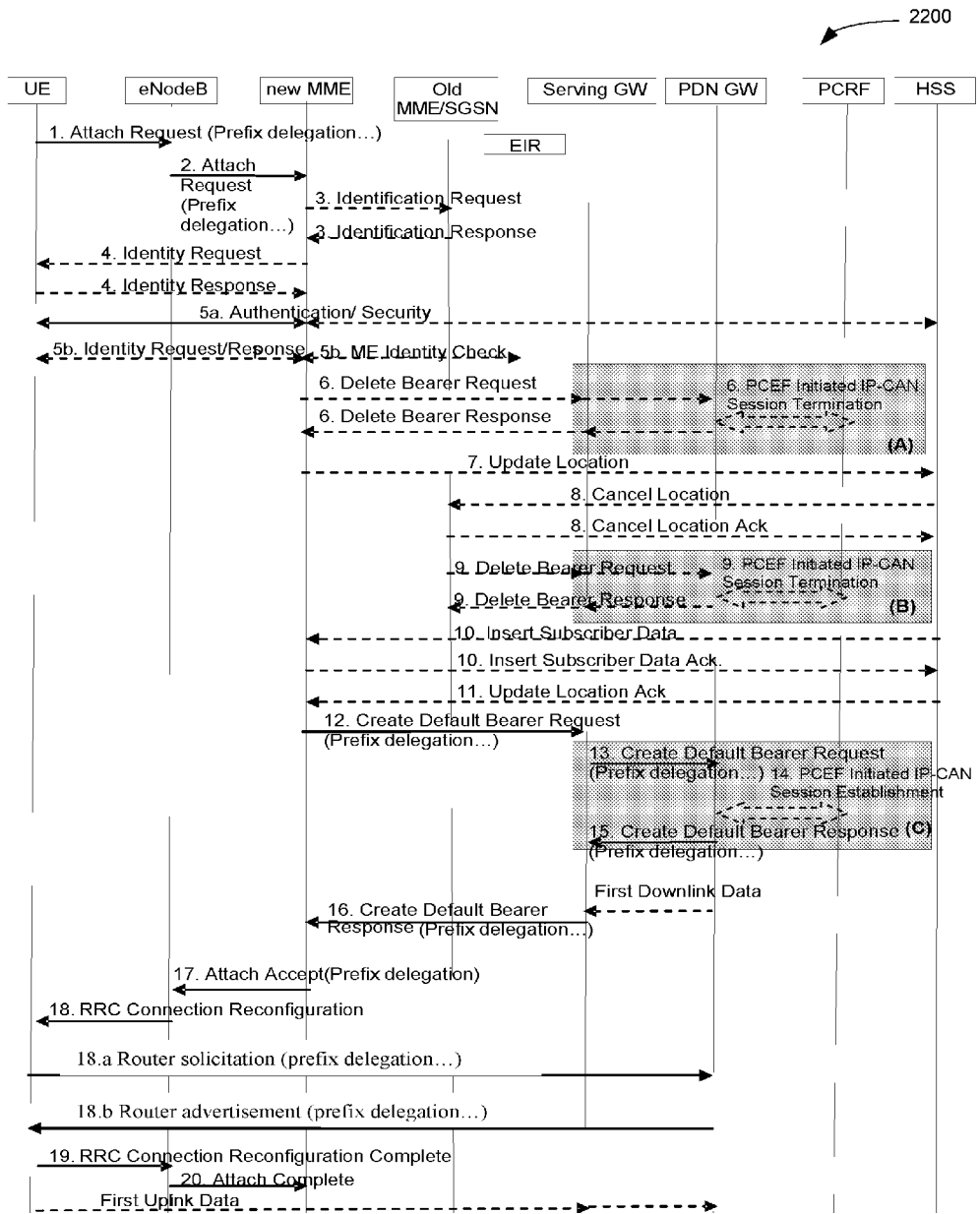
FIG. 22 illustrates an example procedure of prefix delegation using GTP.

FIG. 22 illustrates a procedure 2200 corresponding to prefix delegation using GTP. The steps are as follows. Step 1—A UE initiates an Attach procedure by the transmission of an Attach Request. Step 2—Besides other fields and options described in TS 23.401, if the UE wants to request a delegated prefix, the UE also includes the indication of prefix delegation request in the form of either a new field or a new type of PCO. The eNodeb forwards the Attach Request message to the MME. Steps 3-11 are the same as described in TS 23.401.

Step 12—Besides what is described in TS 23.401, the MME also includes the indication of prefix delegation request in the form of either a new field or a new type of PCO in the Create Default Bearer Request message and sends this message to the Serving GW. Step 13—Besides what is described in TS 23.401, the Serving GW sends the Create Default Bearer Request message, including the indication of prefix delegation request, to the PDN GW. Step 14—The same as described in TS 23.401. Step 15—Besides what is described in TS 23.401, the PDN GW returns a Create Default Bearer Response message that includes the delegated prefix in either a new field or a new type of PCO to the Serving GW. Step 16—Besides what is described in TS 23.401, the Serving GW returns the Create Default Bearer Response message which includes the delegated prefix to the MME.

Step 17—Besides what is described in TS 23.401, the MME sends an Attach Accept message which includes the delegated prefix either in a new field or a new type of PCO to the eNodeB. Step 18—The same as described in TS 23.401. Step 18.a—The UE ignores the IPv6 prefix information in PDN Address and the delegated prefix information, and then may send a Router Solicitation message to the PDN GW to solicit a Router Advertisement message. In the Router Solicitation message, the UE indicates the request of a delegated prefix in addition to an IPv6 home network prefix for stateless IP address configuration. Step 18.b—The PDN-GW sends a Router Advertisement message (solicited or unsolicited) to the UE. The Router Advertisement messages shall contain the same home network prefix and the same delegated prefix as the ones provided during the attach procedure (if it was provided). Then the UE configures its IP address and delegated prefix for other TEs to obtain network connectivity. The rest of the procedure (steps 19, 20) is the same as described in TS 23.401.

Prefix Management after Delegation with IKEv2

After the UE obtains a MNP, during the operation, the MNP may need to be renewed, released, or updated for various reasons. In the following, we propose some mechanisms for managing the delegated MNP by defining extensions in the IKEv2 protocol. As described before, there is lifetime associated with a delegated MNP. When the delegated MNP is about to expire, the lifetime of such MNP needs to be extended; otherwise the UE will be assigned a different MNP and applications running on the TEs and/or the UE would have to use different IP addresses, which results in session discontinuity. The renewal procedure can be initiated by either the UE or the HA. In the following, we describe both UE initiated and HA initiated mechanisms.

Figure 23:
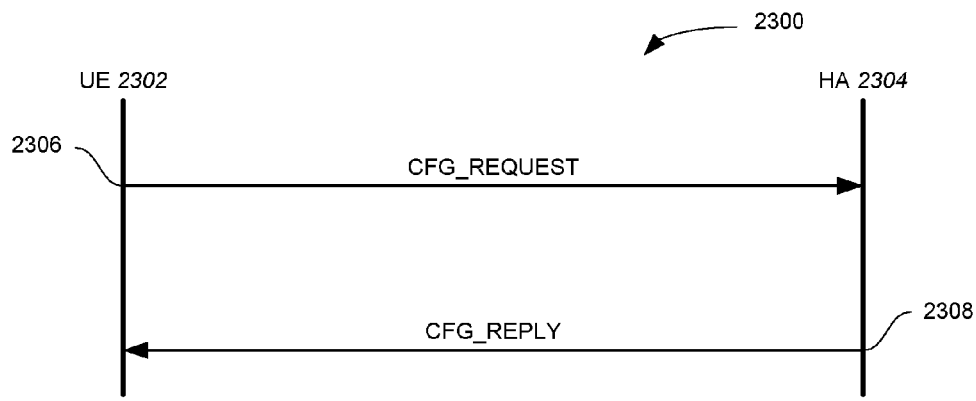
FIG. 23 illustrates an example UE-initiated MNP renewal procedure when an IKEv2 SA is still valid.

When the UE realizes that the MNP is about to expire, it initiates the renewal procedure. In this case, the lifetime of the MNP indicated in the IKEv2 payload is shorted than the lifetime of the IKEv2 SA; therefore, when the MNP is about to expire, the IKEv2 SA between the UE and the HA is still valid. The UE can use the IKEv2 Informational Exchange protected by the IKEv2 SA to renew the MNP. FIG. 23 illustrates a UE initiated MNP renewal procedure 2300 when the IKEv2 SA is still valid.

Referring to FIG. 23, at step 2306, when a UE 2302 realizes that an assigned MNP is about to expire, for example, based on a timer that is initialized by the value indicated in the Prefix Lifetime field or MOBILE_PREFIX_EXPIRY attribute (as described above), the UE initiates the IKEv2 Informational Exchange with an HA 2304. In the Information Exchange message to the HA, the UE indicates one or more MNPs that the UE wants to renew by using one or more CFG_REQUEST payloads. The UE may request different lifetimes for each MNP. Besides the CFG_REQUEST payloads, the UE may include some Notify payload in the same IKEv2 message.

When the HA receives this IKEv2 Informational Exchange message, the HA authenticates this message. If it is valid and the HA authorizes the renewal of such requested MNPs, and the HA returns an Informational Exchange message back to the UE (step 2308). In this message, there is one or more CFG_REPLY payloads, each of which carries one MNP renewed with a new lifetime. Note that the IKEv2 Informational Exchange messages are cryptographically protected with the negotiated keys associated with the IKEv2 SA between the UE and the HA.

Figure 24:
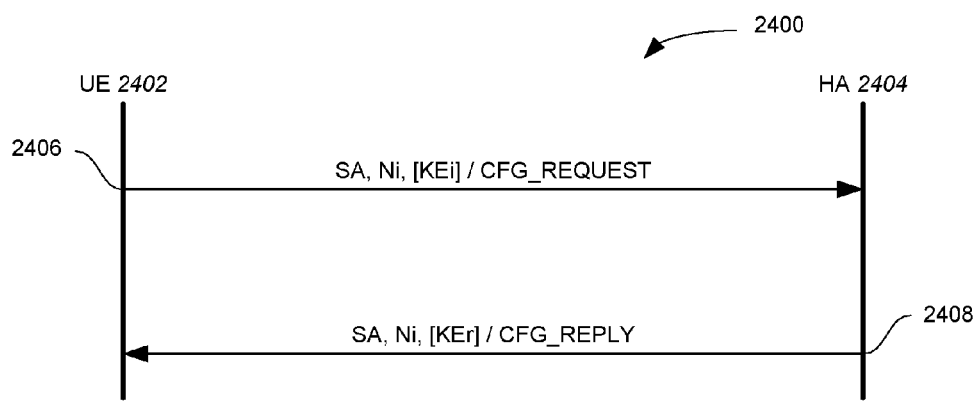
FIG. 24 illustrates an example UE-initiated MNP renewal procedure when the lifetime of the MNP is the same as the lifetime of the IKE SA by using a CREATE_CHILD exchange.

Another way for the UE to renew the MNP is to use a new payload, e.g. a new type of Notify payload or a new type IKEv2 payload, to indicate the renewal of the MNPs during the IKEv2 message exchange with the HA. The UE initiated MNP renewal procedure when the lifetime of the MNP is associated with the lifetime of the IKEv2 SA. If the lifetime of the MNP(s) is associated with the lifetime of the IKE SA, when the MNP is about to expire, the UE can renew the MNP by rekeying the IKE SA using CREATE_CHILD_SA exchange. FIG. 24 illustrates a UE initiated MNP renewal procedure 2400 when the lifetime of the MNP is the same as the lifetime of the IKE SA by using CREATE_CHILD_SA exchange.

At step 2406, a UE 2402 starts a CREATE_CHILD_SA exchange. The UE sends SA offer(s) in the SA payload, a nonce in the Ni payload, and a Diffie-Hellman value in the KEi payload. In one implementation, the Kei payload SHOULD be included. New initiator and responder SPIs are supplied in the SPI fields. In addition, the UE includes one or more CFG_REQUEST payload to request the same MNP(s). The lifetime of such MNPs is also indicated. At step 2406, the HA 2404 authenticates the received IKEv2 message. If valid, the HA replies (using the same Message ID to respond) with the accepted offer in an SA payload, and a Diffie-Hellman value in the KEr payload if the selected cryptographic suite includes that group. In addition to the normal payloads used for rekeying the IKE SA, the HA also includes one or more CFG_REPLY payloads that contain the renewed MNPs. The lifetime associated with the renewed MNPs are also indicated. If the IPSec implementation does not allow using CREATE_CHILD_SA for rekeying the IKE SA, the UE needs to re-establish a new IKE SA as well as Child SAs, if needed, and request the same MNP therein, and finally delete the old IKE SA and associated ole Child SAs.

When the HA realizes that the MNP is about to expire, the HA can initiate a renewal procedure. In one implementation, the HA can initiate MNP renewal procedure when the IKEv2 SA is still valid. In this case, the lifetime of the MNP indicated in the IKEv2 payload is shorted than the lifetime of the IKEv2 SA; therefore, when the MNP is about to expire, the IKEv2 SA between the UE and the HA is still valid. There are two ways for the HA to perform the MNP renewal procedure: 1) the HA sends a trigger, such as a Notify IKEv2 message, to the UE to trigger the UE initiated MNP renewal procedure; 2) the HA starts the IKEv2 Informational Exchange procedure with the UE by using CFG_SET/CFG_ACK or CFG_REQUEST/CFG_REPLY payloads. These two mechanisms are described in detail below.

Figure 25:
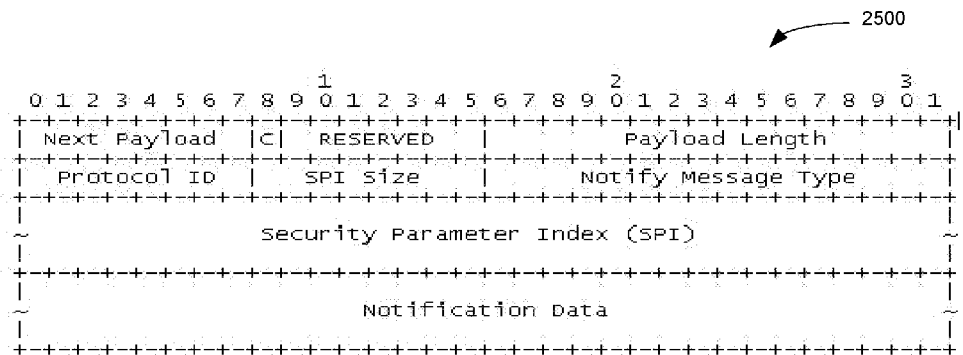
FIG. 25 illustrates an example notify payload—MNP_RENEWAL_NEEDED.

The HA initiated MNP renewal procedure when the IKEv2 SA is still valid by using a trigger will first be described. With this mechanism, the HA starts the Informational Exchange with the UE by sending a trigger to the UE based on its policy/configuration, for example, the HA shall notify the UE if the HA does not receive the renewal request (such as the messages described above) from the UE 5 seconds before the expiration of the MNP. One example of such trigger is a new type of Notify payload, called MNP_RENEWAL_NEEDED. FIG. 25 shows a format 2500 of a MNP_RENEWAL_NEEDED Notify payload. The fields of the format 2500 include: NOTIFY messages: status types; MNP_RENEWAL_NEEDED—16396 (This value will be decided by IANA, for example, 16396).

Figure 26:
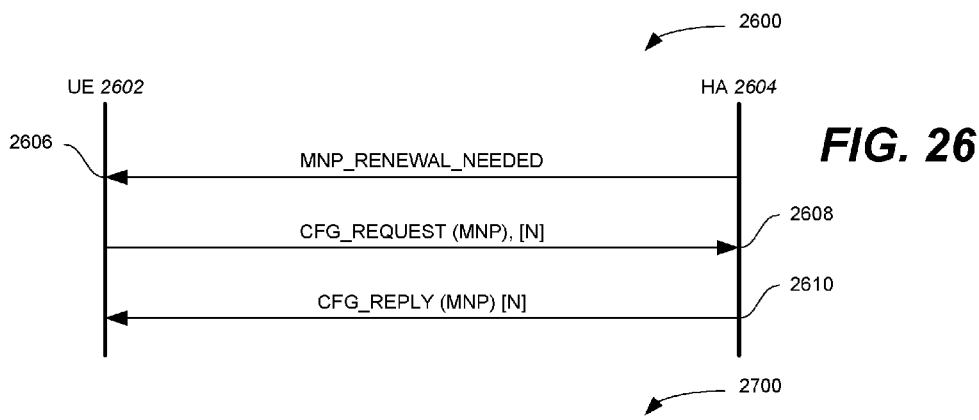
FIG. 26 illustrates an example HA-initiated MNP renewal procedure when an IKEv2 SA is still valid by using a notify payload to trigger the UE-initiated MNP renewal procedure.

FIG. 26 shows an HA initiated MNP renewal procedure 2600 when the IKEv2 SA is still valid and the Notify payload is used as a trigger for the UE initiated MNP renewal procedure (as shown in FIG. 23). At step 2606, an HA 2604 sends a Notify payload, MNP_RENEWAL_NEEDED, inside the Information Exchange message to a UE 2602. Steps 2608, 2610 are the same steps 2306, 2308 shown in FIG. 23.

Figure 27:
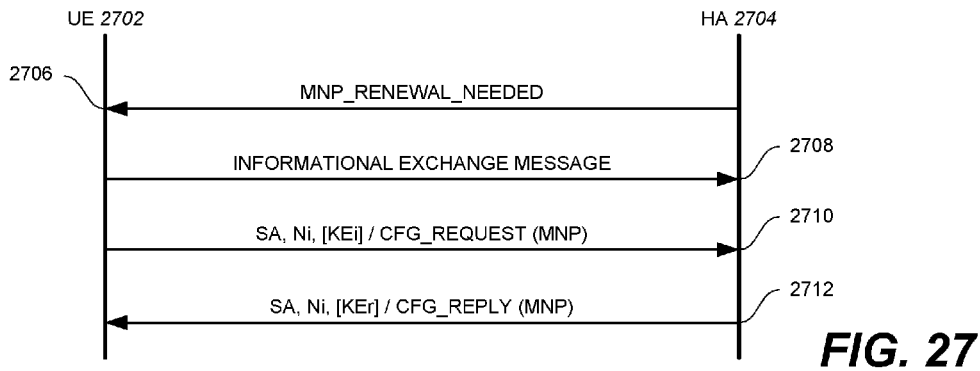
FIG. 27 illustrates another example HA-initiated MNP renewal procedure when an IKEv2 SA is still valid by using a notify payload to trigger the UE-initiated MNP renewal procedure.

FIG. 27 shows an HA initiated MNP renewal procedure 2700 when the IKEv2 SA is still valid and the Notify payload is used as a trigger for the UE initiated MNP renewal procedure shown in FIG. 24. At step 2706, an HA 2704 sends a Notify payload, MNP_RENEWAL_NEEDED, inside the Information Exchange message to a UE 2702. At step 2708, the UE sends an Informational Exchange message with empty payloads to the HA as a response to the previously message sent by the HA, if the UE wants to use the CREATE_CHILD_SA exchange to rekey the IKE SA and renew the MNP. This step may be optional because the HA can see the message received at 2710 as an acknowledgement or response. Steps 2710, 2712 are the same as steps 2406, 2408 shown in FIG. 24. Note that different kinds of triggers can be used during the HA initiated MNP renewal procedures and we skip the details of such procedures here.

As defined in RFC 4306, "CFG_SET/CFG_ACK" allows an IKE endpoint to push configuration data to its peer. Therefore, the HA can indicate the MNP to be renewed together with the new lifetime by using new types of Configuration attributes (such as MOBILE_NETWORK_PREFIX4, MOBILE_NETWORK_PREFIX6, etc.) in the CFG_SET Configuration payload and send the CFG_SET payload to the UE during the Informational Exchange. After the UE receives such CFG_SET payload, the UE accepts such renewed MNPs, then updates its configuration accordingly, and finally sends a CFG_ACK payload as the response to the HA. In the CFG_ACK payload, the UE can include the same MNP and associated lifetime as in the received CFG_SET payload as an indication of acceptance of such MNPs to the HA. If the UE does not want to renew any MNP, the UE can return either an empty CFG_ACK payload or a response message without a CFG_ACK payload. In case that there is any error, the UE can return a Notify payload to the HA.

Figure 28:
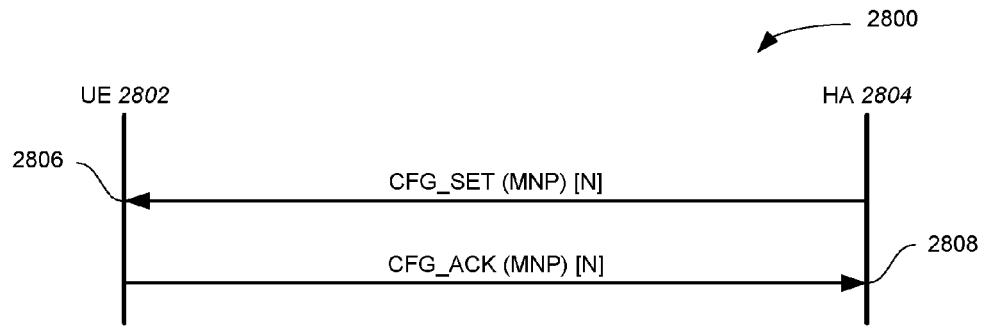
FIG. 28 an example HA-initiated MNP renewal procedure when an IKEv2 SA is still valid by using a CFG_SET/CFG_ACK.

FIG. 28 illustrates an HA initiated MNP renewal procedure 2800 by using CFG_SET/CFG_ACK. At step 2806, The HA sends the CFG_SET payload in an Informational Exchange message to the UE. The CFG_SET payload includes the MNP to be renewed together with a new life time. At step 2802, the UE receives the CFG_SET payload and updates its configuration related to the MNP. As a response, the UE sends the CFG_ACK payload back to the HA. The CFG_ACK payload includes also the MNP renewed and the new lifetime.

Similarly, the HA can also use the CFG_REQUEST/CFG_REPLY payloads to renew a MNP. The procedure is as follows. The HA can send the CFG_REQUEST payload in an Informational Exchange message to the UE. The CFG_REQUEST payload includes the MNP to be renewed together with a new life time. The UE receives the CFG_REQUEST payload and updates its configuration related to the MNP. As a response, the UE sends the CFG_REPLY payload back to the HA. The CFG_REPLY payload includes also the MNP renewed and the new lifetime.

Another way for the HA to explicitly renew the MNP is to define a new payload—e.g., a new type of Notify payload or a new type IKEv2 payload—to indicate the renewal of such MNP during the IKEv2 message exchange with the UE. When the lifetime of the MNP is associated with the lifetime of the IKEv2 SA, there are also two ways for the HA to perform the MNP renewal procedure: 1) the HA sends a trigger, such as a Notify payload in the IKEv2 message, to the UE to trigger the UE to renew the MNP by either rekeying the IKE SA using CREATE_CHILD_SA exchange or re-establishing the IKE SA (as described above); 2) the HA rekeys the IKE SA using CREATE_CHILD_SA exchange or re-establishes the IKE SA.

The UE initiates the MNP release procedure, for example, when the UE wants to power off, or when the UE detects that each previously attached TE detaches from the UE and therefore the UE does not need the allocated MNP anymore, or for any other reason. After the UE releases the MNP, the HA can reallocate such MNP to other UEs, which allows efficient use of one of value network resources, e.g., network address prefixes.

In this case, the UE can release the MNP, either implicitly or explicitly. The implicit way means that the UE does not renew the MNP to be released, thus the MNP is automatically released and put back into a pool for allocation later once the lifetime of such MNP expires. The implicit way is appropriate in the case, for example, when the MNP to be released is about to expire. The explicit way means that the UE sends explicit signaling messages to notify the HA that the UE does not use the MNP anymore. This method allows such MNP to become available to other UEs quickly and thus is appropriate in the case, for example, when the lifetime of such MNP is not about to expire.

Figure 29:
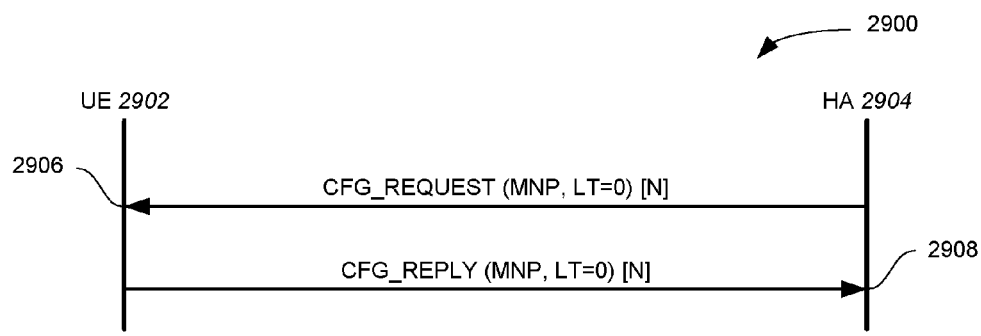
FIG. 29 illustrates an example UE-initiated explicit MNP release procedure when an IKEv2 SA is still valid.

In the UE initiated explicit MNP release procedure, the UE sends a CFG_REQUEST payload with the MNP to be released and the lifetime equal to zero to the HA; and the HA sends back a CFG_REPLY payload with the same MNP and the lifetime equal to zero as a response to the UE. FIG. 29 shows the UE initiated explicit MNP release procedure 2900 in detail. In particular, at step 2906, a UE 2902 starts an Informational Exchange with an HA 2904 and sends an IKEv2 message with a CFG_REQUEST payload indicating the MNP to be released and the lifetime set as zero to the HA. When the HA receives and verifies this message, the HA places the MNP back into the address/prefix pool. The mechanism for the HA to manage such address/prefix pool is out of scope of this disclosure, for example, the HA manages the pool by itself or by communicating with a DHCP server and acting as a DHCP client. As a reply, the HA sends back an IKEv2 message with a CFG_REPLY payload indicating the same MNP and the lifetime as zero to the UE (step 2908). When the UE receives the CFG_REPLY payload, the UE can modify its configuration related to such MNP accordingly.

As discussed above, another way for the UE to explicitly release the MNP is to define a new payload—e.g., a new type of Notify payload or a new type IKEv2 payload—to indicate the deletion of such MNP during the IKEv2 message exchange with the HA. When the lifetime of the MNP is associated with that of the IKEv2 SA, the UE can choose to either not renew the IKEv2 SA, or rekey or re-establish the IKEv2 SA without including the MNP to be released. The HA initiates the MNP release procedure, for example, when the HA wants to withdraw such MNP due to management reasons. After the MNP is released, the HA can reallocate such MNP to other UEs, which allows efficient use of one of value network resources, i.e., network address prefixes.

In this case, the HA can release the MNP, either implicitly or explicitly. The implicit way could be that the HA simply ignores/rejects the request of the MNP renewal received from the UE, and the MNP will be put back into the pool for allocation later after its lifetime expires. The implicit way is appropriate in the case, for example when the lifetime of such MNP is about to expire. The explicit way is that the HA explicitly notifies the UE that the UE cannot use the MNP anymore, so that such MNP can be put back into the pool and re-used as soon as possible. The explicit way is appropriate in the case, for example when the lifetime of such MNP is not about to expire. There are two ways for the HA to explicitly initiate the MNP release procedure: 1) the HA sends a trigger, such as a Notify payload, to trigger the UE initiated MNP release procedure; 2) the HA uses the CFG_SET or CFG_REQUEST payload to set the lifetime associated with the MNP to be zero.

Figure 30:
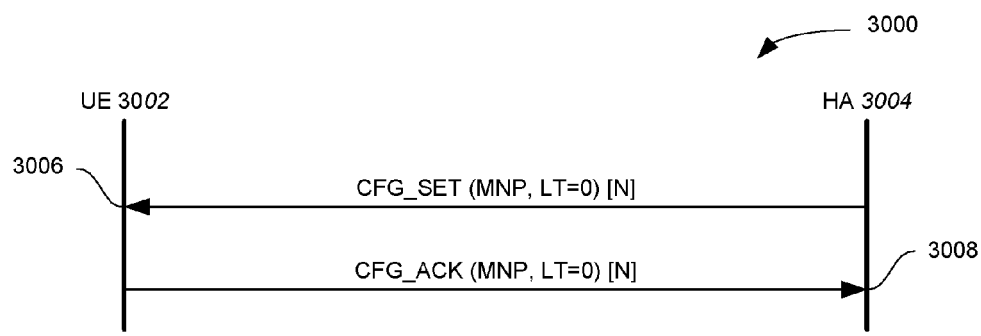
FIG. 30 illustrates an example UE-initiated explicit MNP release procedure when an IKEv2 SA is still valid by using a CFG_SET/CFG_ACK.

A trigger, for example, a new Notify payload, called MNP_Release_NEEDED, can be defined for the HA to trigger the UE initiated MNP release procedure. The format of this payload is similar to that shown in FIG. 25. Similar to procedure 2600 of FIG. 26, the HA can use CFG_SET/CFG_ACK to release a specific MNP. FIG. 30 shows a UE initiated explicit MNP release procedure 3000 when the IKEv2 SA is still valid by using CFG_SET/CFG_ACK. At step 3006, an HA 3004 sends a CFG_SET payload indicating the MNP to be released and the lifetime equal to zero in an IKEv2 Informational Exchange message with a UE 3002. After the UE receives and verifies this IKEv2 message, the UE modifies the configuration related to this MNP and sends back a CFG_ACK payload in an IKEv2 message indicating the MNP released and the lifetime equal to zero as a reply to the HA (step 3008). When the HA receives this response, the HA releases the MNP and places the MNP back to the address/prefix pool.

Also the HA can use CFG_REQUEST/CFG_REPLY to release a specific MNP. The procedure is as follows. The HA sends a CFG_REQUEST payload indicating the MNP to be released and the lifetime equal to zero in an IKEv2 Informational Exchange message with the UE. After the UE receives and verifies this IKEv2 message, the UE modifies the configuration related to this MNP and sends back a CFG_REPLY payload in an IKEv2 message indicating the MNP released and the lifetime equal to zero as a reply to the HA. When the HA receives this response, the HA releases the MNP and puts it back to the address/prefix pool.

Another way for the HA to explicitly release the MNP is to define a new payload, e.g., a new type of Notify payload or a new type IKEv2 payload, to indicate the deletion of such MNP during the IKEv2 message exchange with the UE. If the lifetime of the MNP is associated with the lifetime of the IKEv2 SA, the HA can choose to either disallow the renewal of the IKEv2 SA with the MNP to be released, or rekey or re-establish the IKEv2 SA without including the MNP to be released.

Updating the MNP

Both the UE and the HA can initiate the MNP update procedure, for example, to enable the network renumbering. The MNP update procedure usually includes two steps, releasing an old MNP and assigning a new MNP. In the following we describe the mechanisms to update the MNP in details.

Figure 31:
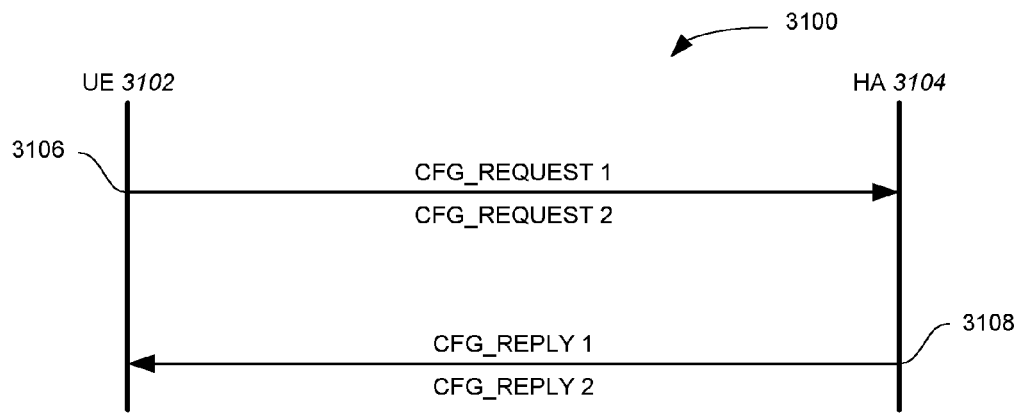
FIG. 31 illustrates an example UE-initiated MNP update procedure when an IKEv2 SA is still valid.

Updating the MNP can happen when the UE requests the renewal of the MNP and the HA returns a different MNP as a replacement, if allowed by its configuration or policy. Furthermore, the UE can explicitly request the MNP update. FIG. 31 illustrates a UE initiated MNP update procedure 3100 when the IKEv2 SA is still valid. At step 3106, to request updating a specific MNP, a UE 3102 can include two CFG_REQUEST payloads or two Configuration Attributes in one CFG_REQUEST payload in the IKEv2 Informational Exchange message: one CFG_REQUEST payload or one Configuration Attribute indicates the previously assigned MNP and the lifetime equal to zero and the other CFG_REQUEST payload or the other Configuration Attribute indicates the request of a new MNP, for example, by setting the MNP as zero. At step 3208, the HA 3104 returns two CFG_REPLY payloads or two Configuration Attributes in one CFG_REPLY payload as a response: one CFG_REPLY payload or one Configuration Attribute indicates the previously assigned MNP and the lifetime equal to zero (as a confirmation of releasing the previously assigned MNP) and the other CFG_REPLY payload or the other Configuration Attribute indicates a newly assigned MNP with the length of the lifetime.

Another way for the UE to update the MNP is to define a new payload, e.g. a new type of Notify payload or a new type IKEv2 payload, to indicate updating an existing MNP during the IKEv2 message exchange with the HA. A UE can request updating its MNP during the procedure of rekeying or re-establishing a new IKEv2 SA. Also, when an HA decides to update the previously assigned MNP, the HA can sends a trigger, e.g., a new type of Notify payload, called MNP_UPDATE_NEEDED, to the UE. Then the UE initiated MNP update procedure is performed.

Figure 32:
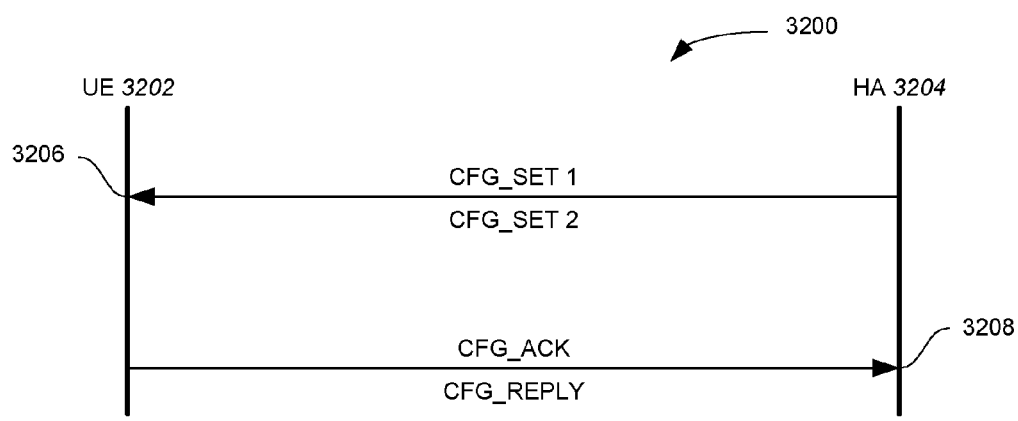
FIG. 32 illustrates an example HA-initiated MNP update procedure when an IKEv2 SA is still valid by using a CFG_SET/CFG_ACK.

FIG. 32 illustrates an HA initiated MNP update procedure 3200 when the IKEv2 SA is still valid by using CFG_SET/CFG_ACK. At step 3206, to update a specific MNP, the HA 3204 can include two CFG_SET payloads or two Configuration Attributes in one CFG_SET payload in the IKEv2 Informational Exchange message: one CFG_SET payload or one Configuration Attribute indicates the previously assigned MNP and the lifetime equal to zero and the other CFG_SET payload or the other Configuration Attribute indicates a new MNP with a new lifetime. At step 3208, the UE 3202 returns two CFG_ACK payloads or two Configuration Attributes in one CFG_ACK payload as a response: one CFG_ACK payload or one Configuration Attribute indicates the previously assigned MNP and the lifetime equal to zero (as a confirmation of releasing the previously assigned MNP) and the other CFG_ACK payload or the other Configuration Attribute indicates the newly assigned MNP with the length of the lifetime.

Also the CFG_REQUEST/CFG_REPLY payloads can be used to update a specific MNP. The procedure is as follows. The HA includes two CFG_REQUEST payloads or two Configuration Attributes in one CFG_REQUEST payload in the IKEv2 Informational Exchange message: one CFG_REQUEST payload or one Configuration Attribute indicates the previously assigned MNP and the lifetime equal to zero and the other CFG_REQUEST payload or the other Configuration Attribute indicates a new MNP with a new lifetime. The UE should return two CFG_REPLY payloads or two Configuration Attributes in one CFG_REPLY payload as a response: one CFG_REPLY payload or one Configuration Attribute indicates the previously assigned MNP and the lifetime equal to zero (as a confirmation of releasing the previously assigned MNP) and the other CFG_REPLY payload or the other Configuration Attribute indicates the newly assigned MNP with the length of the lifetime.

Another way for the HA to update the MNP is to define a new payload—e.g., a new type of Notify payload or a new type IKEv2 payload—to indicate updating an existing MNP during the IKEv2 message exchange with the UE. In this case, the HA can update a previously assigned MNP during the procedure of rekeying or re-establishing a new IKEv2 SA with the UE.

Managing Multiple MNPs

The UE and the HA may request, renew, release and update multiple MNPs in one IKEv2 message. To do so, usually multiple Configuration Attributes or Configuration Payloads are needed in one IKEv2 message and each Configuration Attribute or Configuration Payload corresponds to one MNP to be managed. In order to avoid ambiguity, the IKEv2 response also needs to include multiple Configuration Attributes or Configuration Payloads, each of which corresponds to the Configuration Attribute or Configuration Payload received in the IKEv2 request before.

Updating Mobility States when Using Host Based Mobility Protocols

When hosted based mobility protocols are used by the UE to establish network connectivity, some mobility states, such as Binding Cache entry and Binding Update list, are created at the UE and the HA when the UE is not at its home link. Extensions to mobility signaling messages are needed in order to update MNP related mobility states maintained at the UE and the HA, before or after the MNP is managed by using extensions defined in the IKEv2 protocol.

Mobility states can be updated when renewing a mobile network prefix (MNP). After the MNP is renewed using extended IKEv2 messages, the UE can initiate the procedure to renew the Binding Cache entry, for example by sending a BU message indicating the renewed MNP to the HA, if the lifetime of such Binding Cache is about to expire.

There are two ways to perform the HA initiated mobility states update procedure. First, the HA initiates the procedure by sending a trigger to the UE. Such trigger is an indication, such as a new type of mobility signaling message, or a new mobility option or a new Generic Notification subtype carried in a mobility signaling message; and the UE then starts the UE initiated mobility states update procedure as described above after receiving this trigger.

Second, the HA can send a notification to notify the UE that the MNP and/or the Binding Cache entry are renewed and the UE sends a response to acknowledge the reception of such a notification. There are many different ways to define such notification and acknowledgement. For example, these ways include but not limited to new types of mobility signaling messages, the Generic Notification Message (as defined in Generic Notification Message for Mobile IPv6) with new Generic Notification subtypes or new mobility options. An option/payload/field similar to or same as the Delegated Prefix option described above can be used to indicate the renewed MNP and the lifetime.

Updating Mobility States when Releasing an MNP

Either before or after the MNP is released by using extended IKEv2 messages, a UE can initiates the procedure to remove the released MNP from the Binding Cache entry, for example, by sending a BU message without the released MNP or with the lifetime of the released MNP set as zero to the HA.

There are two ways to perform an HA initiated mobility states update procedure. First, either before or after the MNP is released by using extended IKEv2 messages, the HA initiates the procedure by sending a trigger to the UE. Such trigger is an indication, such as a new type of mobility signaling message, or a new mobility option or a new Generic Notification subtype carried in a mobility signaling message. After receiving this trigger, the UE then starts the UE initiated mobility states update procedure as described above to remove the released MNP from the Binding Cache entry.

Second, either before or after the MNP is released by using extended IKEv2 messages, an HA can send a notification to notify the UE that the MNP to be released is removed from the Binding Cache entry and the UE sends a response to acknowledge the reception of such a notification. There are many different ways to define such notification and acknowledgement. For example, these ways include but not limited to new types of mobility signaling messages, the Generic Notification Message with new Generic Notification subtypes or new mobility options, or the Binding Revocation Indication/Acknowledgement Message (as defined in Binding Revocation for IPv6 Mobility) with new mobility options to indicate the MNP to be released. An option/payload/field similar to or same as the Delegated Prefix option described above can be used to indicate the released MNP.

Updating Mobility States when Updating an MNP

Either before or after the MNP is updated by using extended IKEv2 messages, a UE can initiate a procedure to update the Binding Cache entry, for example, by sending a mobility signaling message with the indication of updating a MNP or sending a BU message with the new assigned MNP to the HA. There are two ways to perform an HA initiated mobility states update procedure.

First, either before or after the MNP is updated by using extended IKEv2 messages, the HA initiates the procedure by sending a trigger to the UE. Such trigger is an indication, such as a new type of mobility signaling message, or a new mobility option or a new Generic Notification subtype carried in a mobility signaling message. After receiving this trigger, the UE then starts the UE initiated mobility states update procedure as described above to update the Binding Cache entry.

Second, the HA can send a notification to notify the UE that the MNP previously assigned is replaced with a new MNP and the Binding Cache entry is modified accordingly. And the UE sends a response to acknowledge the reception of such a notification. There are many different ways to define such notification and acknowledgement. For example, these ways include but not limited to new types of mobility signaling messages, the Generic Notification Messages with new Generic Notification subtypes or new mobility options. An option/payload/field similar to or same as the Delegated Prefix option described above can be used to indicate the updated MNP and the lifetime.

Prefix Management after Delegation with Network Based Mobility Protocols

After the UE obtains a MNP when attaching to a network by using network based mobility protocols, during the operation, the MNP may need to be renewed, released, or updated for various reasons. The states maintained by the MAG and the LMA related to the MNP need to be updated as well. Disclosed herein are mechanisms for managing the delegated MNP by defining extensions in network based mobility protocols. In one implementation, focus is directed to the extensions defined for PMIP in the following. The extensions needed for GTP are similar to those for PMIP.

A MAG initiated MNP renewal procedure is first described. When triggered by a request (e.g., indicated by a Router Solicitation message with a new payload/option) from the UE or for other reasons, the MAG can initiate the MNP renewal procedure, for example, by sending a request of renewing an allocated MNP to the LMA. After the LMA receives and authorizes this request, the LMA returns a reply to notify the MAG of the approval of the renewal of the requested MNP. There are many different ways to define such request and reply. For example, the request could be a PBU using an option/payload/field similar to or same as the Delegated Prefix option described above to indicate the renewed MNP and its lifetime. The reply could be a PBA using an option/payload/field similar to or same as the Delegated Prefix option described above to indicate the renewed MNP and its lifetime.

With respect to an LMA initiated MNP renewal procedure, there are such a renewal procedure can be performed. First, the LMA sends a trigger to the MAG and then the MAG performs the MAG initiated MNP renewal procedure. Such trigger is an indication, such as a new type of mobility signaling message, or a new mobility option or a new Generic Notification subtype carried in a mobility signaling message. After the trigger is received by the MAG, the MAG initiated MNP renewal procedure as described in above can be performed. Second, the LMA sends a notification to notify the MAG that the MNP in the Binding Cache entry is renewed and the MAG sends a response to acknowledge the reception of such a notification. There are many different ways to define such notification and acknowledgement. For example, these ways include but not limited to new types of mobility signaling messages, the Generic Notification Message with new Generic Notification subtypes or new mobility options. An option/payload/field similar to or same as the Delegated Prefix option described above can be used to indicate the renewed MNP and the lifetime.

With respect to a MAG initiated MNP release procedure, when triggered by a request (e.g., indicated by a Router Solicitation message with a new payload/option) from the UE or for other reasons, the MAG can initiate the procedure to remove the released MNP from the Binding Cache entry, for example, by sending a PBU message without the released MNP to the HA or with an option/payload/field (e.g., the Delegated Prefix option described above) indicating the released MNP and the lifetime set as zero. The LMA then returns a response, for example, a PBA message with the Delegated Prefix option, to the MAG.

With respect to a LMA initiated MNP release procedure, the LMA first initiates the procedure by sending a trigger to the MAG. Such trigger is an indication, such as a new type of mobility signaling message, or a new mobility option or a new Generic Notification subtype carried in a mobility signaling message. After receiving this trigger, the MAG then starts to perform the MAG initiated MNP release procedure, as described above, to remove the released MNP from the Binding Cache entry.

Second, the LMA sends a notification to notify the MAG that the MNP to be released is removed from the Binding Cache entry and the MAG sends a response to acknowledge the reception of such a notification. There are many different ways to define such notification and acknowledgement. For example, these ways include but not limited to new types of mobility signaling messages, the Generic Notification Message with new Generic Notification subtypes or new mobility options, or the Binding Revocation Indication/Acknowledgement Message with new mobility options, to indicate the MNP to be released. An option/payload/field similar to or same as the Delegated Prefix option described above can be used to indicate the released MNP.

With respect to a MAG initiated MNP update procedure, when triggered by a request (e.g., indicated by a Router Solicitation message with a new payload/option) from the UE or for other reasons, the MAG can initiate the MNP update procedure by sending a request to update the MNP to the LMA. Such request, for example, can be a PBU message with a new flag/mobility option, or a new type of mobility signaling message, or a Generic Notification message with a new subtype or mobility option. The LMA shall return a reply to the MAG to indicate whether the request is accepted or not and if so a new MNP. Such reply, for example, can be a PBA message with a new flag/mobility option, or a new type of mobility signaling message, or a Generic Notification message with a new subtype or mobility option. An option/payload/field similar to or same as the Delegated Prefix option described above can be used to carry the old or new MNP.

With respect to a LMA initiated MNP update procedure, the LMA first initiates the procedure by sending a trigger to the MAG. Such trigger is an indication, such as a new type of mobility signaling message, or a new mobility option or a new Generic Notification subtype carried in a mobility signaling message. After receiving this trigger, the MAG then starts to perform the MAG initiated MNP update procedure as described above. Second, the LMA sends a notification to notify the MAG that the MNP previously assigned is replaced with a new MNP and the Binding Cache entry is modified accordingly. And the MAG sends a response to acknowledge the reception of such a notification. There are many different ways to define such notification and acknowledgement. For example, these ways include but not limited to new types of mobility signaling messages, the Generic Notification Messages with new Generic Notification subtypes or new mobility options. An option/payload/field similar to or same as the Delegated Prefix option described above can be used to indicate the updated MNP and the lifetime.

One or more of the method or procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 33:
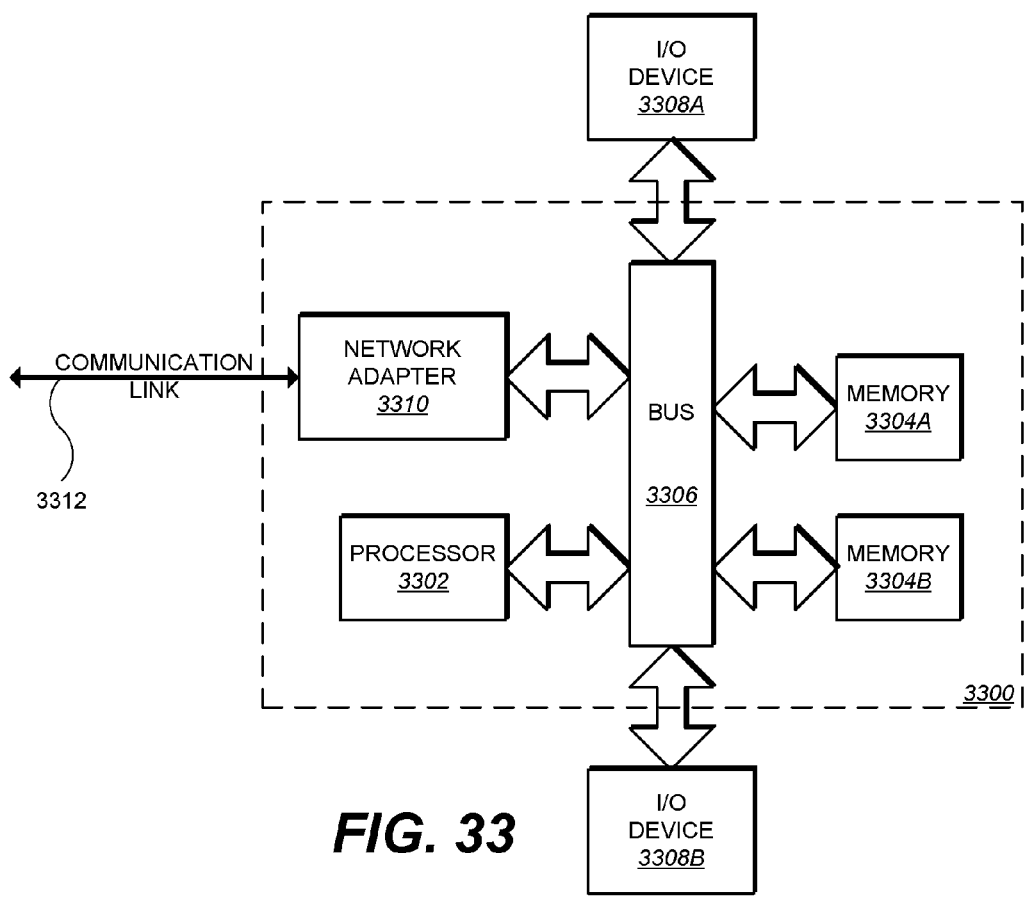
FIG. 33 is a block diagram of a data processing system suitable for storing and/or executing program code in accordance with one implementation of the invention.

FIG. 33 illustrates a data processing system 3300 suitable for storing and/or executing program code. Data processing system 3300 includes a processor 3302 coupled to memory elements 3304A-B through a system bus 3306. In other implementations, data processing system 3300 may include more than one processor and each processor may be coupled directly or indirectly to one or more memory elements through a system bus. Memory elements 3304A-B can include local memory employed during actual execution of the program code, bulk storage, and cache memories that provide temporary storage of at least some program code in order to reduce the number of times the code must be retrieved from bulk storage during execution. As shown, input/output or I/O devices 3308A-B (including, but not limited to, keyboards, displays, pointing devices, etc.) are coupled to data processing system 3300. I/O devices 3308A-B may be coupled to data processing system 3300 directly or indirectly through intervening I/O controllers (not shown).

In one implementation, a network adapter 3310 is coupled to data processing system 3300 to enable data processing system 3300 to become coupled to other data processing systems or remote printers or storage devices through communication link 3312. Communication link 3312 can be a private or public network. Modems, cable modems, and Ethernet cards are just a few of the currently available types of network adapters.

What is claimed is:

1. A method for dynamically allocating a mobile network prefix to a mobile terminal, the mobile terminal being associated with a user equipment, the method comprising:
sending a message, from the user equipment to a home agent, to establish a security association between the user equipment and the home agent, wherein the message includes
(i) a request for a second mobile network prefix to be assigned to the mobile terminal, wherein the second mobile network prefix is to replace a first mobile network prefix previously assigned to the mobile terminal,
(ii) the first mobile network prefix previously assigned to the mobile terminal, and
(iii) an indication that a lifetime of the first mobile network prefix previously assigned to the mobile terminal has expired;
in response to the request, the home agent allocating the second mobile network prefix to be assigned to the mobile terminal; and
assigning the second mobile network prefix to the mobile terminal.

2. The method of claim 1, wherein the message comprises an Internet Key Exchange version 2 (IKEv2) Informational Exchange.

3. The method of claim 2, wherein the request for the second mobile network prefix is specified in the IKEv2 Informational Exchange by a MOBILE_NETWORK_PREFIX4 attribute in a CFG_REQUEST payload.

4. The method of claim 2, wherein the request for the second mobile network prefix is specified in the IKEv2 Informational Exchange by a MOBILE_NETWORK_PREFIX6 attribute in a CFG_REQUEST payload.

5. The method of claim 2, wherein the request for the second mobile network prefix is specified in the IKEv2 Informational Exchange by a MOBILE_NETWORK_PREFIX4 attribute and a MOBILE_NETWORK_PREFIX6 attribute in a CFG_REQUEST payload.

6. The method of claim 1, wherein the user equipment comprises a cell phone, and the mobile terminal comprises a blue tooth device.

7. A method comprising:
transmitting, from a user equipment to a home agent, a request for allocating a second mobile network prefix to a mobile terminal equipment associated with the user equipment, wherein the request includes (i) an identification of a first mobile network prefix and (ii) an indication that a lifetime of the first mobile network prefix has expired; and
in response to transmitting the request including (i) the identification of the first mobile network prefix and (ii) the indication that the lifetime of the first mobile network prefix has expired, receiving, by the user equipment from the home agent, a response indicating that the home agent has allocated the second mobile network prefix to the mobile terminal equipment.

8. The method of claim 7, wherein the first mobile network prefix was previously allocated to the mobile terminal equipment, prior to transmitting the request.

9. The method of claim 7, wherein the response includes an indication of a duration of time for which the allocated second mobile network prefix is valid.

10. The method of claim 7, further comprising:
assigning, by the user equipment, the second mobile network prefix to the mobile terminal equipment.

11. The method of claim 7, wherein the response received by the user equipment from the home agent further indicates (i) the first mobile network prefix and (ii) the lifetime of the first mobile network prefix being equal to zero as a confirmation that the home agent has released the previously allocated mobile network prefix.

12. A method comprising:
receiving, by a home agent from a user equipment, a request for a second mobile network prefix to be allocated to a mobile terminal equipment associated with the user equipment, wherein the request includes (i) an identification of a first mobile network prefix and (ii) an indication that a lifetime of the first mobile network prefix has expired;
in response to receiving the request including (i) the identification of a first mobile network prefix and (ii) the indication that the lifetime of the first mobile network prefix has expired, allocating, by the home agent, the second mobile network prefix to the mobile terminal equipment; and
transmitting, by the home agent to the user equipment, a response that includes the second mobile network prefix.

13. The method of claim 12, wherein the response by the home agent to the user equipment further includes the lifetime of the previously allocated mobile network prefix being expired as a confirmation that the home agent has released the first mobile network prefix.

14. The method of claim 12, wherein the response further includes an indication of a duration of time for which the allocated second mobile network prefix is valid.

\* \* \* \* \*